(12) United States Patent
Rey

(10) Patent No.: US 9,978,465 B2
(45) Date of Patent: *May 22, 2018

(54) SYSTEM FOR REGULATING A LIQUID IN A CIRCUIT

(71) Applicant: COMMISSARIAT A L'ENERGIE ATOMIQUE ET AUX ENERGIES ALTERNATIVES, Paris (FR)

(72) Inventor: Frédéric Rey, Pierrevert (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 48 days.

This patent is subject to a terminal disclaimer.

(21) Appl. No.: 14/894,956

(22) PCT Filed: May 27, 2014

(86) PCT No.: PCT/EP2014/060909
§ 371 (c)(1),
(2) Date: Nov. 30, 2015

(87) PCT Pub. No.: WO2014/191388
PCT Pub. Date: Dec. 4, 2014

(65) Prior Publication Data
US 2016/0125962 A1    May 5, 2016

(30) Foreign Application Priority Data

May 31, 2013 (FR) ..................................... 13 55026

(51) Int. Cl.
*G21C 1/09* (2006.01)
*F16K 5/06* (2006.01)
(Continued)

(52) U.S. Cl.
CPC .............. *G21C 1/09* (2013.01); *F16K 5/0605* (2013.01); *G21C 1/02* (2013.01); *G21C 19/207* (2013.01); *G21C 19/31* (2013.01); *Y02E 30/34* (2013.01)

(58) Field of Classification Search
CPC ........ G21C 1/09; G21C 19/34; G21C 19/207; G21C 1/02; Y02E 30/34; F16K 5/0407;
(Continued)

(56) References Cited

U.S. PATENT DOCUMENTS 3,684,241 A * 8/1972 Hartmann ............. F16K 5/0605
                                                    137/625.22
3,767,162 A * 10/1973 Olsson ................... F16K 5/0647
                                                    251/175

(Continued)

FOREIGN PATENT DOCUMENTS

WO    WO 2011/058249    5/2011

OTHER PUBLICATIONS

European Patent Office International Search Report and Written Opinion dated Jul. 31, 2014, for International Application No. PCT/EP2014/060909; Applicant, Commissariat a L'Energie Atomique et Aux Energies Alternatives (7 pages).

*Primary Examiner* — Michael R Reid
(74) *Attorney, Agent, or Firm* — McCracken & Gillen LLC

(57) ABSTRACT

This invention relates to a system for regulating a liquid in a circuit, with the system comprising: a plug valve comprising at least one inlet and one outlet, the plug comprising an internal passage through which is intended to pass the liquid flowing from the inlet to the outlet of the valve when the valve is open at least partially, an expansion reservoir in communication with the liquid flowing in the circuit and intended to contain liquid and a compensating gas, characterized in that the plug comprises at least partially an (Continued)

Coupe C-C expansion channel which has at least one lateral opening located on a lateral face of the plug and which is conformed to provide a permanent communication between said lateral opening and the expansion reservoir, the valve being conformed in such a way that: at least when the valve is closed: the lateral opening is in direct communication with the liquid coming from the inlet or from the outlet of the valve, when the valve is open at least partially, the lateral opening cooperates with an inner wall integral with a body of the valve in such a way as to form a conduit in communication on the one hand with the expansion reservoir and on the other hand with the internal passage. The invention also relates to a circuit integrating this system as well as a use of this system.

33 Claims, 16 Drawing Sheets

(51) Int. Cl.
*G21C 1/02* (2006.01)
*G21C 19/20* (2006.01)
*G21C 19/31* (2006.01)

(58) Field of Classification Search
CPC ............. F16K 5/0605; Y10T 137/3115; Y10T 137/3118; Y10T 137/7737; Y10T 137/7761; Y10T 137/85954; Y10T 137/86002; Y10T 137/86549; Y10T 137/8782
USPC ....... 137/206, 207, 468, 487.5, 563, 625.17, 137/876
See application file for complete search history.

(56) References Cited

U.S. PATENT DOCUMENTS 4,173,234 A * 11/1979 Thomas .............. F16K 11/0873
　　　　　　　　　　　　　　　　　　　　137/625.47
5,237,827 A * 8/1993 Tchernev .................. F03G 6/00
　　　　　　　　　　　　　　　　　　　　62/106
5,722,458 A　　3/1998 Potter

* cited by examiner

Coupe A-A

Coupe B-B

Coupe C-C

Coupe B-B

Coupe C-C

Coupe A-A

Coupe B-B

Coupe B-B

Coupe C-C

Coupe B-B

Coupe C-C

SYSTEM FOR REGULATING A LIQUID IN A CIRCUIT

TECHNICAL FIELD OF THE INVENTION

The invention relates in general to the field of equipment allowing for the circulation of a liquid in a circuit. More precisely, the invention relates to a system intended to be integrated into a circuit of which the direction of circulation can be alternated.

It applies particularly advantageously to industrial circuits wherein it is desirable to vary the load and the direction of circulation.

An application relates for example to the cleaning of equipment of the circuit, such as filters, by reversing the direction of circulation.

Another application related to test circuits which make it possible to test or characterise equipment such as pumps. A privileged field of application is the nuclear industry with the characterisation of equipment integrated into the reactors for which the heat carrying fluid is a liquid metal.

As such, the invention is particularly suited in the development of 4th generation sodium cooled reactors such as the ASTRID reactor (Advanced Sodium Technological Reactor for Industrial Demonstration).

PRIOR ART

In certain types of circuits, it is necessary to be able to reverse the direction of circulation of the liquid. For this, there are pumps able to deliver a reversible flow. This is the case with electromagnetic pumps (EMP).

Reversing the direction of circulation of the fluid in a circuit inevitably modifies the distribution of the pressure along the latter. This change in the distribution of pressure is not compatible with a circuit that is not provided for this such as shall be explained in more detail hereinbelow in reference to FIG. 1 which describes a conventional circuit.

The circuit shown in FIG. 1 comprises a pump 2 and a throttle valve 9, making it possible for example to interrupt the circulation or to vary the load loss as is the case in circuits for testing and characterising pumps. In the example shown in FIG. 1, the circuit furthermore has an exchanger 6, for example to evacuate the heat that the pump supplies to the circuit. Pump 2, throttle valve 9 and exchanger 6 are placed in series.

The circuit also comprises an expansion reservoir 7, also designated as a pressurisation reservoir, placed upstream of the pump 2 and as a bypass with respect to the circuit and being connected to a pipe. In a known manner, and as shown in FIG. 1, an expansion reservoir 7 comprises an expansion chamber in free and permanent communication with the liquid of the circuit and comprises a gas 72 applying a pressure on the free surface 73 of the liquid 71 of the expansion reservoir 7. No flow circulated in the expansion reservoir 7. There is only a displacement of the liquid 71 of the expansion reservoir 7 that makes it possible to offset the variations in volume of the liquid present in the circuit. This variation in volume is due to the variations in the temperature of the liquid. In the framework of the heat carrying fluid circuit, these variations in volume can be substantial. As such, the expansion reservoir 7 makes it possible to limit the variations in pressure upstream of a pump 2.

The expansion reservoir 7 is associated with a device for controlling the pressure of the pressurisation gas Pc, which through injecting or removing gas makes it possible to vary the pressure of the gas 72 and therefore the pressure. It is also provided with a protective device 8 that limits the pressure in the circuit in order to prevent the destruction of it and the associated consequences. In the event of excess pressure in the circuit, the protective device 8 activates and the excess pressure (of gas and/or of liquid) is directed to an outlet 81. There is then an opening of the circuit.

In the test circuits, by measuring the pressure PC of the expansion reservoir 7, and the pressures upstream Pe and downstream Ps of the pump 2 as well as by varying parameters such as the direction of circulation of the liquid and the load loss by actuating the throttle valve 9, the behaviour of the pump 2 can be characterised.

In FIG. 1, the direction of circulation is shown by the arrows. The distribution of the pressure is then such that: Ps>Pe. Through simplification, it is considered here that Pc Pe. Indeed Pc is fixed by the value of the pressure Pe and the difference between these two pressures is equal to the pressure exerted by the height of the liquid between the altitude of the free surface 73 in the expansion reservoir 7 and the altitude of the inlet of the pump 2. This altimeter pressure is most often negligible. The pressure Pc is generally fixed at a value close to atmospheric pressure (from 1 to 2 bars abs), therefore clearly less than the values that Ps can take (from a few bars to several ten of bars and even more). The protective device 8 is provided to trigger if the pressure Pc reaches a limit value beyond which the installation is no longer safe. In the case of the preceding diagram, this device could be adjusted to a pressure that is just slightly greater than Pc, i.e. 2.5 bars for example. If the direction of circulation is that of FIG. 1, i.e. from the pump 2 to the throttle valve 9, the unit is operating correctly.

FIG. 2 shows the circuit of FIG. 1 wherein the direction of circulation is reversed.

This inversion in the direction of circulation, even voluntary, causes the pump 2 to deliver at pressure Ps in the portion of the circuit that is connected to the expansion reservoir 7. This therefore risks triggering the protective device 8 and opening the circuit although there is no failure of the circuit.

Moreover, the pressure Pe at the inlet of the pump 2 can potentially fall under the saturation vapour pressure of the fluid contained in the circuit and result in its vaporisation in the portion of the circuit between the throttle valve 9 and the pump 2. The pump 2 can then be damaged and substantial turbulence can be generated.

As such, the relative position of the pump 2 and of the expansion reservoir 7 depends on the direction of the circulation of the liquid in the circuit. This therefore gives rise to a problem in circuits with a reversible direction of circulation.

In order to allow for the reversibility of the direction of circulation, a solution consists in providing the circuit with two throttle valves 9, 91 and with two expansion reservoirs 7, 7', each provided with a safety device 8, 8' and with a pressure control device. Such a system is shown in FIGS. 3 and 4. Furthermore, it is necessary to provide an isolation valve 74, 74' between each expansion reservoir and the circuit. According to the direction of circulation, an expansion reservoir 7, 7' is disconnected from the circuit by closing the isolation valve 74, 74' that connects it to the circuit. In these figures the valves in dotted lines are fully open and the valves in solid lines are fully closed.

This solution has for disadvantage to require a substantial amount of equipment and increased complexity which tends to reduce the reliability of the unit and increase the manufacturing and maintenance cost. In addition, this requires either frequent human intervention for opening and closing of valves, or the setting up of an automatic pilot system, with the risks of failure.

Another solution shown in FIGS. 5 and 6, consists in providing a circuit provided with two throttle valves 9, 91 and with a single expansion reservoir 7 provided with a protective device 8 and with a pressure control device. The throttle valve 9 arranged at the inlet of pump 2 is always fully open. This valve is shown as a dotted line in the two directions of circulation. When the expansion reservoir is arranged at the inlet of the pump (FIG. 5), the circuit operates normally, since the pressure at the outlet of the pump is not directly transferred to the expansion reservoir 7.

When the expansion reservoir 7 is arranged at the outlet of the pump (FIG. 6), the load loss provoked by the exchanger risks lowering the pressure excessively at the pump inlet and conveying it under a cavitation threshold.

This solution is therefore limited to applications wherein the pressure is sufficiently high to avoid cavitation. The range of useful flow is therefore necessarily reduced.

There is therefore a need consisting in offering a solution that allows for a circulation of liquid that is reversible and which does not have at least some of the disadvantages mentioned hereinabove of existing solutions.

This invention aims to achieve this objective for circuits in which the valve is a plug valve.

More precisely, it has for purpose to propose a circuit that integrates a plug valve and that makes it possible to alternate the direction of circulation while limiting the complexity of the circuit and by allowing for an unrestricted operating range, and this preferably for several types of plug valves.

SUMMARY OF THE INVENTION

In order to achieve this objective, an embodiment of this invention relates to a system for regulating a liquid in a circuit preferably able to reverse the direction of the circulation, with the system comprising:
  a plug valve comprising at least one inlet and one outlet, with the plug comprising an internal passage through which is intended to pass the liquid flowing from the inlet to the outlet of the valve when the valve is open at least partially, with the position of the plug with respect to a body of the valve making it possible to adjust the rate of the flow of the liquid through the valve,
  an expansion reservoir in communication with the liquid flowing in the circuit and intended to contain liquid and a compensating gas,
The plug comprises at least partially an expansion channel which has at least one lateral opening located on a lateral face of the plug and which is conformed to provide a communication between said lateral opening and the expansion reservoir, the valve being conformed in such a way that:
  at least when the valve is closed: the lateral opening is in direct communication with the liquid coming from the inlet or from the outlet of the valve, i.e. when the internal passage does not communicate directly with the inlet or the outlet of the valve; the liquid present in the inlet or the outlet of the valve can therefore communicate with the expansion reservoir by entering the expansion channel through the lateral opening,
  when the valve is open at least partially, i.e. when the internal passage communicates directly with the inlet and/or the outlet of the valve, the lateral opening cooperates with an inner wall of a body of the valve in such a way as to form a conduit in communication on the one hand with the expansion reservoir and on the other hand with the internal passage.

As such, the expansion reservoir is connected to the circuit by the intermediary of the valve, preferably between the inlet and the outlet of the valve, and in such a way that the expansion reservoir communicates with at least one from among the inlet and the outlet of the valve regardless of the position of the plug.

The position of the plug is also independent of the pressure of the liquid in the circuit and in the expansion reservoir. The channel of the plug allows permanent communication between the expansion reservoir and at least one of the branches of the circuit.

As such, the invention makes it possible to design a reversible circuit wherein the expansion reservoir is permanently in communication with the liquid of the circuit.

Furthermore, the invention makes it possible to considerably improve the reliability of the system since it does not require controlling the isolation valves of one or more reservoirs with precision as in a solution of prior art. With the solution shown in FIGS. 3 and 4, incorrect controlling of the isolation valves can indeed result in a simultaneous deactivation of the two expansion reservoirs which can have serious consequences.

Moreover, it is possible to have only one throttle valve formed by the valve. This makes it possible to reduce the load loss that is inevitable induced by the presence of additional valves as is the case in other solutions of prior art. The invention as such makes it possible to widen the range of admissible flows.

In addition to simplifying the control of the expansion reservoir, the invention makes it possible to significantly reduce the number of components required and in particular the number of control components, which makes it possible to improve the reliability of the circuit and to reduce the cost of it.

Moreover, the system according to the invention makes it possible to precisely and reliably control the lowest pressure of the circuit, as such preventing the pressure in the circuit from falling below a minimum desired pressure.

Particularly advantageously, the system according to the invention applies to straight valves, also designated as in-line valves, as well as to elbow valves. It can therefore be integrated into all of the portions of the circuit, into the straight sections as well as curvatures or angles.

One of the advantages of the invention is to reduce the risks of jets of liquid appearing inside the expansion reservoir. The level of the free surface of the liquid in the expansion reservoir is therefore stabilised which increases the reliability of the control of the level and of the pressure of the liquid in the circuit.

Optionally, the invention can furthermore have at least one of any one of the following characteristics separately or in combination:
  Advantageously, the system is configured in such a way that the expansion reservoir is, during operation, in permanent communication with the liquid flowing in the circuit
  Preferably, the conduit opens on the one hand into the expansion reservoir an opens on the other hand into a space formed by a lower face of the plug and a bottom of the body of the valve, with this space being in communication with the internal passage by a channel made in the plug.

Preferably, the lateral opening is a recess, with the cooperation of the recess and the inner wall integral with the body of the valve forming the conduit when the valve is open at least partially.

The body comprises a seat configured to receive a plug. The inner wall integral with the body is a wall of the seat. Alternatively, the body of the valve does not include a seat and the wall integral with the body of the valve with which the plug cooperates and an inner wall opposite an outer wall of the body of the valve.

Preferably, the recess extends from the expansion reservoir to the lower face of the plug. More precisely, the recess extends from an upper face of the body of the plug to the lower face of the plug. Preferably, the recess forms a groove.

According to an advantageous embodiment, the plug is a spherical plug. This type of plug has for advantage to improve the seal. The invention makes it possible to be applied in a particular simple manner to this type of valve. Alternatively, the plug is a cylindrical plug.

Advantageously, the system is conformed in such a way that when the valve is open, the expansion reservoir communicates with the liquid passing through the valve solely through the recess, of said space and of the lower channel.

Advantageously, the valve is of the "full-flow" type. It makes it possible, when it is fully open to create a load loss of the same degree as the portion of a pipe, elbow or straight section, of the same length.

Preferably, all of the liquid flowing from the circuit to the expansion reservoir passes through the expansion channel or channels.

Preferably, the system is conformed in such a way that when the valve is open, the expansion reservoir communicates with the liquid passing through the valve solely through the recess, of said space and of the lower channel. As such, when the valve is open and the speed of circulation of the liquid is substantial, the liquid penetrating into the expansion reservoir does not pass directly from the internal passage to the expansion reservoir, which as such limits the jets in the latter.

Advantageously, the valve is a straight valve. More generally, the inlet and the outlet of the valve form an angle between 130° and 180°. Alternatively, the valve is an elbow valve, with the inlet and the outlet of the valve forming an angle less than 130°.

Advantageously, the valve comprises a body and a cover forming an enclosure, with the expansion reservoir being housed in the enclosure. As such, the expansion reservoir and the valve are grouped together within the same component. This makes it possible in particular to simplify the mounting of the circuit and to limit the encumbrance. Furthermore, the number of components is limited and the reliability of the circuit is improved. In particular, the seal of the system is made particularly safe.

The obturator is movable inside the body of the valve. The movable obturator is movable with respect to the expansion reservoir. The valve body is fixed with respect to a frame of the system. Typically, the valve body is fixed with respect to the conduits connected at the inlet and at the outlet of the valve. The expansion reservoir is fixed with respect to the valve body during the displacement of the movable obturator.

Advantageously, the expansion reservoir is formed at least partially by an inner wall of the valve body. More precisely, the expansion reservoir is formed by the inner walls of the valve body, by the inner wall of the cover and by an upper face of the body of the movable obturator. Preferably, the expansion reservoir is defined only by the inner walls of the valve body, by the inner wall of the cover and by an upper face of the body of the movable obturator.

The expansion reservoir is housed at least partially in the cover. Preferably, at least 20% and preferably at least 30% and preferably at least 50% of the internal volume of the expansion reservoir is housed in the internal volume of the cover. The obturator is separated from the cover. It is not present in the cover.

According to an advantageous embodiment, the expansion reservoir is vertically arranged higher than the movable obturator. The liquid present in the expansion reservoir can therefore flow via gravity to the movable obturator. Preferably, the expansion reservoir can be arranged vertically and above the movable obturator or not be arranged vertically to the movable obturator. According to an advantageous embodiment, the expansion reservoir surmounts the movable obturator.

According to an embodiment, the movable obturator is separated from at least a portion of the expansion reservoir. As such, in at least a portion of the expansion reservoir, the movable obturator is absent.

According to an embodiment, the expansion reservoir is separated from the obturator.

According to an embodiment, the expansion reservoir is connected to the valve by being arranged at a distance from the latter.

The expansion reservoir is separate from the obturator. This makes it possible in particular to not drive the expansion reservoir in displacement during the displacement of the movable obturator, improving as such the reliability and the robustness of the system. The independence between the expansion reservoir and obturator also makes it possible to independently dimension the expansion reservoir and the movable obturator. In particular, the expansion reservoir can be adapted, in particular in terms of volume, to the characteristics of the circuit (flow, pressure), while still retaining a movable obturator of small size in order to reduce the encumbrance of the system and carry out a movable obturator with dimensions and surface states that are perfectly controlled.

The expansion reservoir is configured in such a way as to contain a compressed gas Advantageously, in closed position, the body of the plug prevents any communication of the liquid between the inlet and the outlet i.e. from one flange to the other.

Advantageously, the system is configured in such a way as to orient the direction of closing of the plug according to the direction of the circulation of the liquid in the circuit.

Advantageously, in closed position of the valve, the internal passage of the plug remains in communication with a portion of the circuit separating the valve from an inlet of the pump.

Advantageously, the plug is actuated by a control device comprising a reduction gear housed inside the expansion reservoir. As such it is located in the enclosure. Advantageously, the reduction gear is immersed in the compensating gas, reducing as such the sealing constraints.

Advantageously, the system comprises an overflow in order to limit the level of liquid in the expansion reservoir and wherein the reduction gear is arranged above the overflow. The system is configured in such a way that the level of liquid in the expansion reservoir is less than a given level, and wherein, the reduction gear is arranged above this given level.

Advantageously, the system comprises a device arranged in the expansion reservoir, under the overflow and configured to break the jets of liquid coming from the expansion channel.

Advantageously, the system comprises a thermal protection device housed inside the expansion reservoir and conformed to thermally insulate the reduction gear from the heat of the liquid.

Advantageously, the system comprises a rotational guiding bearing of the plug and wherein the bearing is housed inside the expansion reservoir. As such, the bearing is located in the enclosure. Advantageously, the system is configured in such a way that in operation the bearing is immersed in the fluid. Alternatively it is immersed in the compensating gas and is located outside of the fluid. Advantageously, the bearing comprises a passage allowing the free circulation of the fluid through the bearing.

Advantageously, the valve is a throttle valve.

Advantageously, the inlet and/or the outlet is formed by a flange configured to be connected to a pipe of the circuit.

Another aspect of this invention relates to a circuit comprising a system according to any of the preceding characteristics and a pump able to deliver in two opposite directions. Optionally and advantageously:

the plug comprises at least one expansion channel for the passing of the liquid opening into an internal passage of the plug in order to place in communication the expansion reservoir and the circuit, the circuit being configured in such a way as to orient the direction of closing of the plug according to the direction of the circulation of the liquid in the circuit.

the circuit is configured in such a way that, during the closing of the valve, the plug is turned in such a way that the internal passage remains in communication with a portion of the circuit separating the valve from an inlet of the pump.

the circuit comprises a single valve. As such the load loss is limited with respect to circuits comprising two valves in order to ensure the reversible operation of the circuit. The range of admissible flow is therefore more substantial.

Another aspect of this invention relates to the usage of a system according to the invention to adjust the circulation of a liquid having a temperature greater than or equal to 350° C. and preferably greater than or equal to 400° C.

Preferably, the invention is used to adjust the circulation of liquid sodium intended to provide for the heat transfer in a circuit of a sodium cooled nuclear reactor.

The other objects, characteristics and advantages of this invention shall appear when examining the following description and the accompanying drawings. It is understood that other advantages can be incorporated therein.

BRIEF DESCRIPTION OF THE FIGURES

The purposes and objects as well as the characteristics and advantages of the invention shall appear better in the detailed description of an embodiment of the latter which is shown in the following accompanying drawings wherein.

The drawings are provided as examples and do not limit the invention. They form diagrammatical representations intended to facilitate the understanding of the invention and are not necessarily at the scale of practical applications. In particular the relative dimensions and thicknesses of the various parts, walls and members do not represent reality.

DETAILED DESCRIPTION OF THE INVENTION

Figure 7:
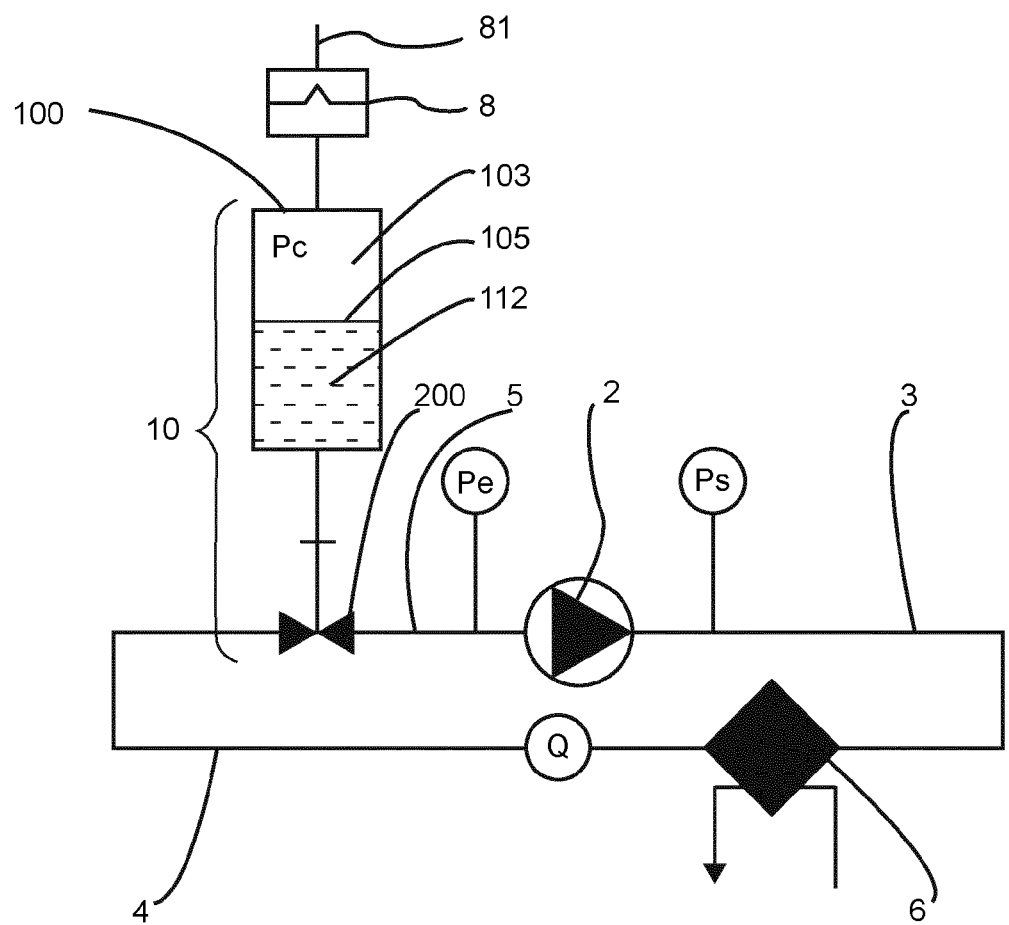
FIG. 7 is a diagram showing an example of a circuit provided with a system according to an embodiment of the invention.

An example of a circuit integrating a system according to the invention shall now be described in reference to FIG. 7.

In this example, the circuit 1 comprises a pump 2, preferably reversible, an exchanger 6 and a system 10 according to the invention comprising a valve 200. These three elements are arranged in series. They form a closed circuit and are fluidly connected together by sections 3, 4 5 of pipes. The section 3 connects the pump 2 to the exchanger 6, the section 4 connects the exchanger 6 to the valve 200 of the system 10 and the section 5 connects the valve 200 of the system 10 to the pump.

In the framework of this invention, circuit 1 is qualified as the closed circuit comprising the pump 2 and comprising preferably the exchanger 6 or any other member(s) as well as the valve 200 of the system 10. Other elements can naturally be incorporated into the system 10. Moreover, the exchanger 6 can be replaced with another component or several other components.

The pump 2 is reversible which allows it to have for inlet and for outlet, respectively the sections 5 and 3 or inversely for inlet and for outlet respectively the sections 3 and 5. The valve 200 comprises an outlet and an inlet that are inverted according to the direction of the circulation of the liquid.

Particularly advantageously, the system 10 comprises an expansion reservoir 100 that makes it possible to offset the variations in the volume of the liquid present in the circuit and which are due to the variations in the temperature of the liquid. The expansion reservoir 100 is connected to the valve 200 mounted in series on circuit 1. As such, the expansion reservoir 100 is not connected in series on the circuit 1 comprising the pump 2 and the valve 200. It is connected as a bypass by the intermediary of valve 200.

Valve 200 is configured to allow for permanent communication between the circuit 1 and the expansion reservoir 100. As such, regardless of the position of the plug 210 of the valve 200, the expansion reservoir 100 communicates with at least one of the sections 4 or 5 of the circuit.

Figure 3:
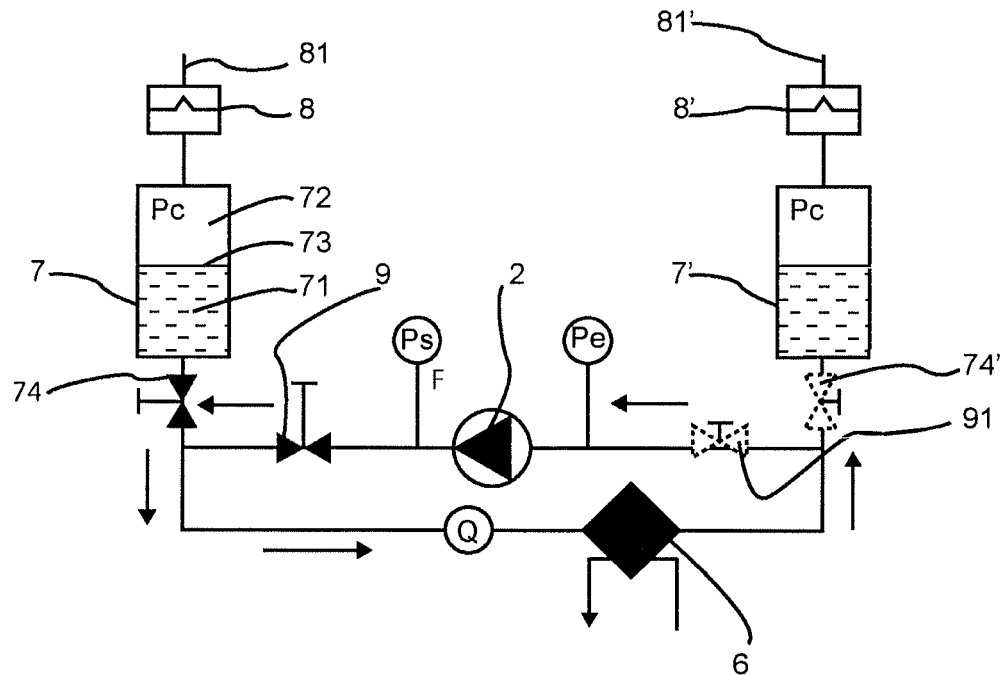
FIGS. 3 and 4 are diagrams showing a second circuit according to prior art wherein the liquid circulates respectively in a first direction and in a second direction.
Figure 4:
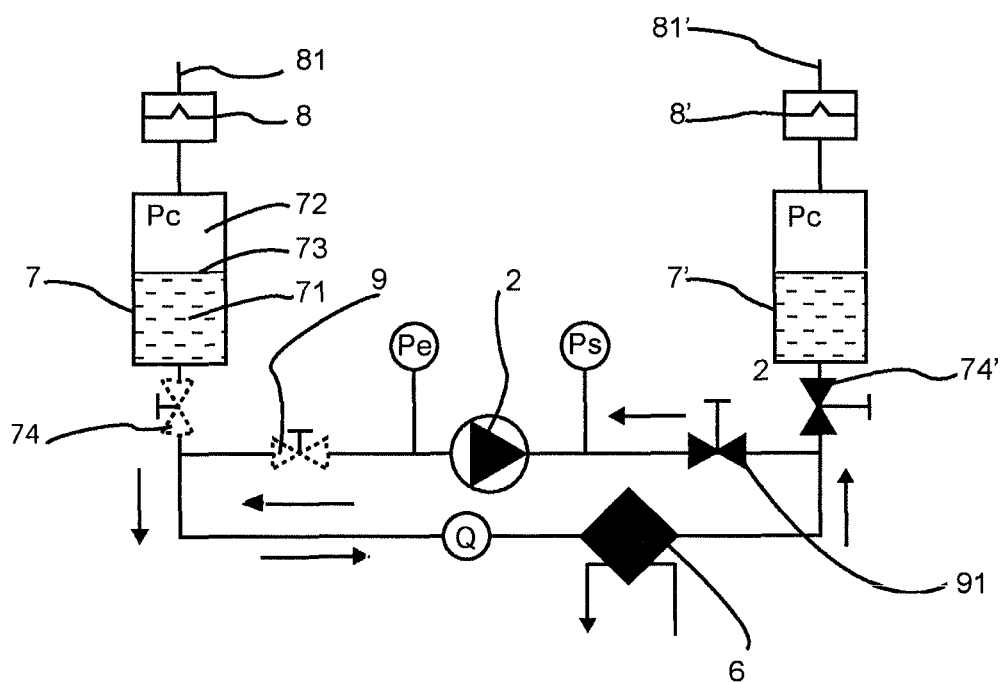
Figure 5:
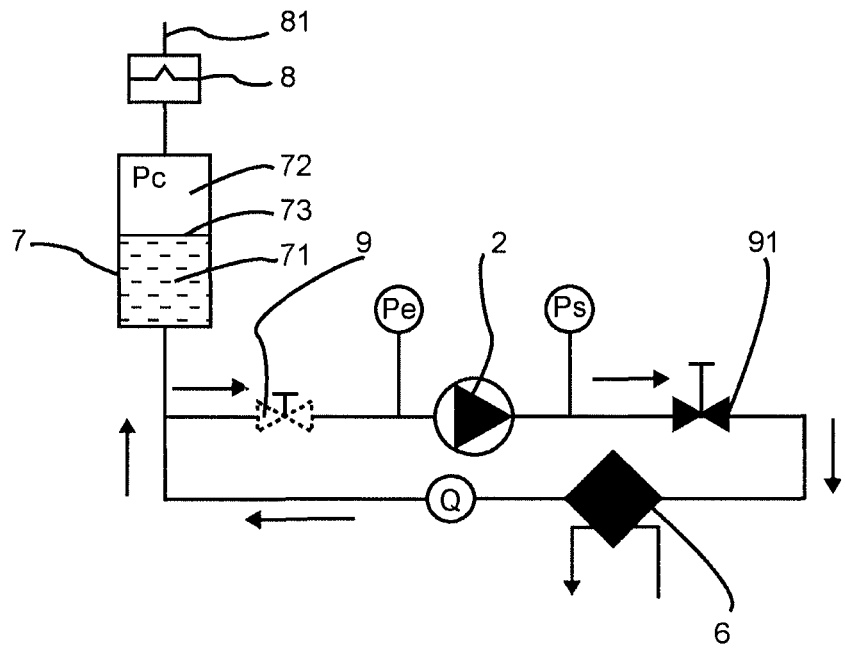
FIGS. 5 and 6 are diagrams showing a third circuit according to prior art wherein the liquid circulates respectively in a first direction and in a second direction.
Figure 6:
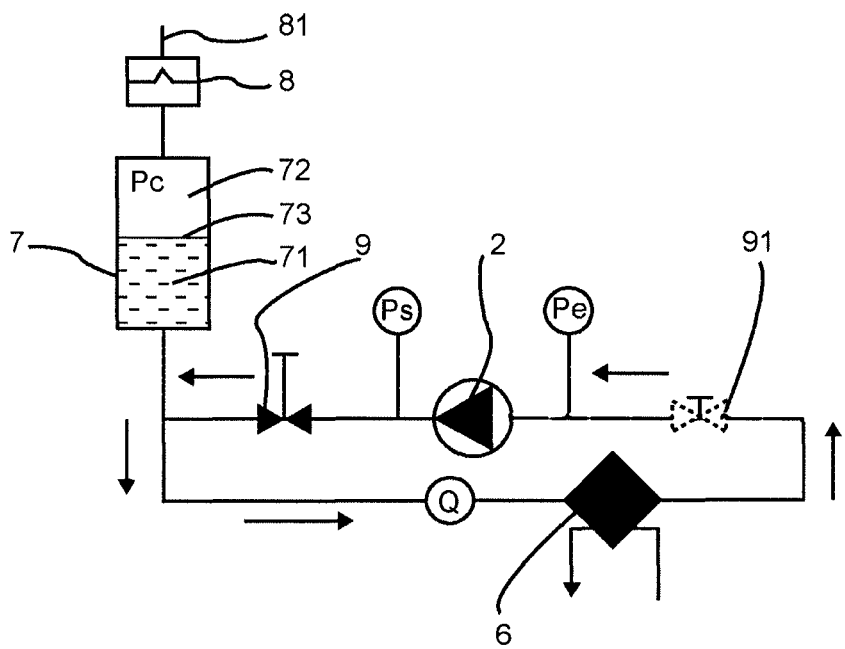

Particularly advantageously, this makes it possible to considerably improve the reliability of the system 10 since it is no longer required to control the isolation valves of one or more reservoirs with precision as in the solution shown in FIGS. 3 and 4. Moreover, it is possible to have only one throttle valve formed by the valve 200. This makes it possible to reduce the load loss that is inevitable induced by the presence of additional valves as is the case in the solutions shown in FIGS. 5 and 6. In particular, the invention does not require the presence of a throttle valve 91 on the section 3 between the exchanger 6 and the pump 2. The invention as such makes it possible to widen the range of admissible flows. In addition to simplifying the control of the expansion reservoir 100, the invention makes it possible to significantly reduce the number of components required and in particular the number of control components, which makes it possible to improve the reliability of the circuit 1 and to reduce the cost of it.

The expansion reservoir 100 can be connected on the valve 200 by being arranged at a distance from the latter. In a preferred embodiment, the expansion reservoir 100 and the valve 200 are on the contrary grouped together within the same component. This makes it possible in particular to simplify the mounting of the circuit and to limit the encumbrance. More advantageously, this makes it possible to approach the expansion reservoir 100 of the circuit 1 and as such improve the reactivity of the expansion reservoir 100 and a protective device 8 against excessive pressure associated with the expansion reservoir 100. Advantageously, the portions of the expansion reservoir comprising the liquid 112 and the pressurisation gas 103 have substantially identical diameters.

Preferentially, the expansion reservoir 100 surmounts the valve 200 and communicates with the liquid of the circuit by a channel, designated as expansion channel 213, carried at least partially by the plug 210. Also advantageously, the valve 200 comprises a body 201 and a cover 101 forming together an enclosure 102, with the expansion reservoir 100 being housed inside this enclosure 102.

As such, the movable obturator is separate from the expansion reservoir 100, with the latter fixed with respect to the body 201 of valve 200. The movable obturator is movable with respect to the expansion reservoir.

In non-restricted embodiments shown in the figures which are described hereinbelow, the expansion reservoir 100 is vertically arranged above the movable obturator. More precisely, the expansion reservoir 100 surmounts the movable obturator. The expansion reservoir is formed by the inner walls 201 of the valve 200, by the inner wall of the cover 101 and by an upper face 214 of the body of the movable obturator. As such, the expansion reservoir is housed at least partially in the cover. Preferably, at least 20% and preferably at least 30% and preferably at least 50% of the internal volume of the expansion reservoir 100 is housed in the internal volume of the cover 101.

A first example of the system 10 according to the invention shall now be described in detail in reference to FIGS. 8 to 17.

In the following example, the valve 200 is a throttle valve or a valve that makes it possible to circulate or interrupt the circulation of the liquid inside the circuit 1.

Figure 8:
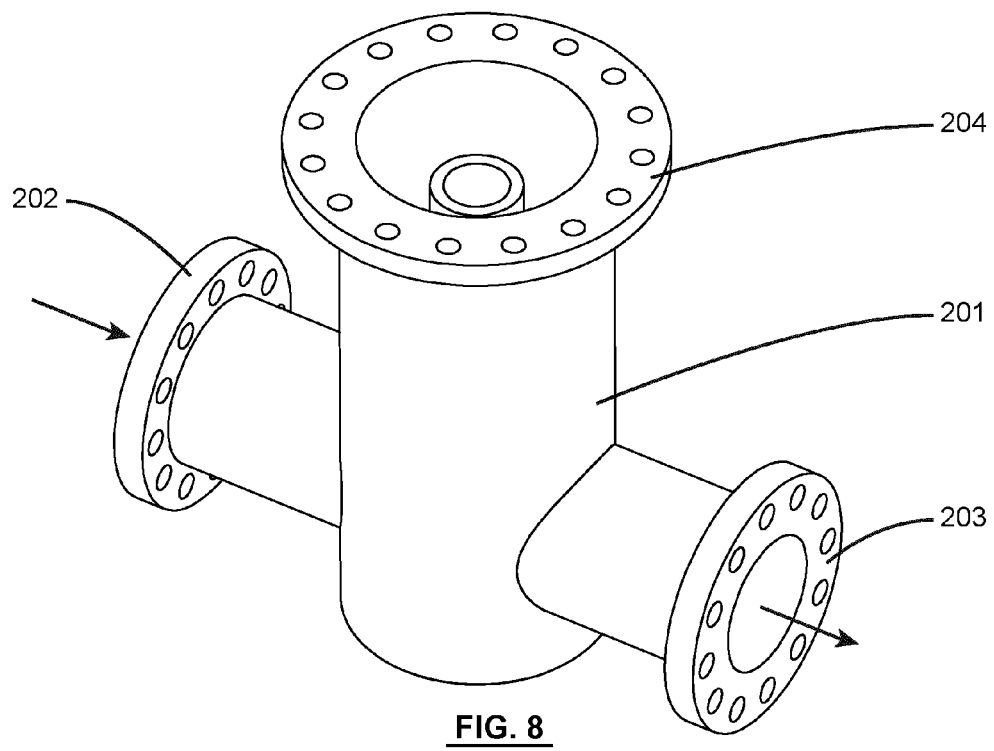
FIG. 8 is a perspective view of a valve body of a system according to a first embodiment of the invention.
Figure 9:
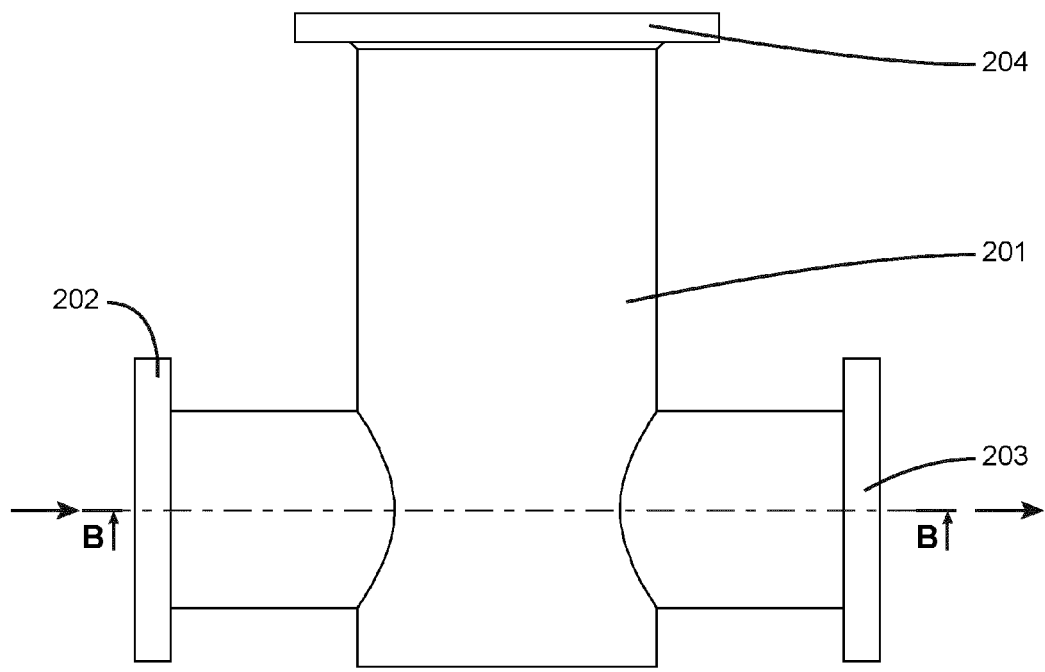
FIG. 9 is a side view of the valve body shown in FIG. 8.

FIGS. 8 and 9 show the body 201 of the valve inside of which the plug 210 for example cylindrical, is movable in order to adjust the passage of the liquid from one flange to another of the valve 200. For a direction of circulation of the fluid, the flange 202 forms the inlet of the valve and the flange 203 forms the outlet of the valve. The inlet and outlet are naturally inverted in case of an inversion in the direction of circulation. In the example shown, the flanges 202, 203 are intended to be connected to a pipe by bolting without this being restrictive. Indeed, a fastening via welding can be considered, in particular for applications wherein the liquid is a liquid metal such as sodium as is the case in sodium cooled nuclear reactors.

In the following example, the valve is an in-line valve, with the inlet and the outlet substantially coaxial. Sections 4 and 5 are then arranged in the extension of one another. Moreover, the plug is spherical.

As shall be shown in what follows in reference to FIGS. 18 to 27, the invention also covers the plug valves 200 that have an elbow. It also covers cylindrical plugs.

Figure 10:
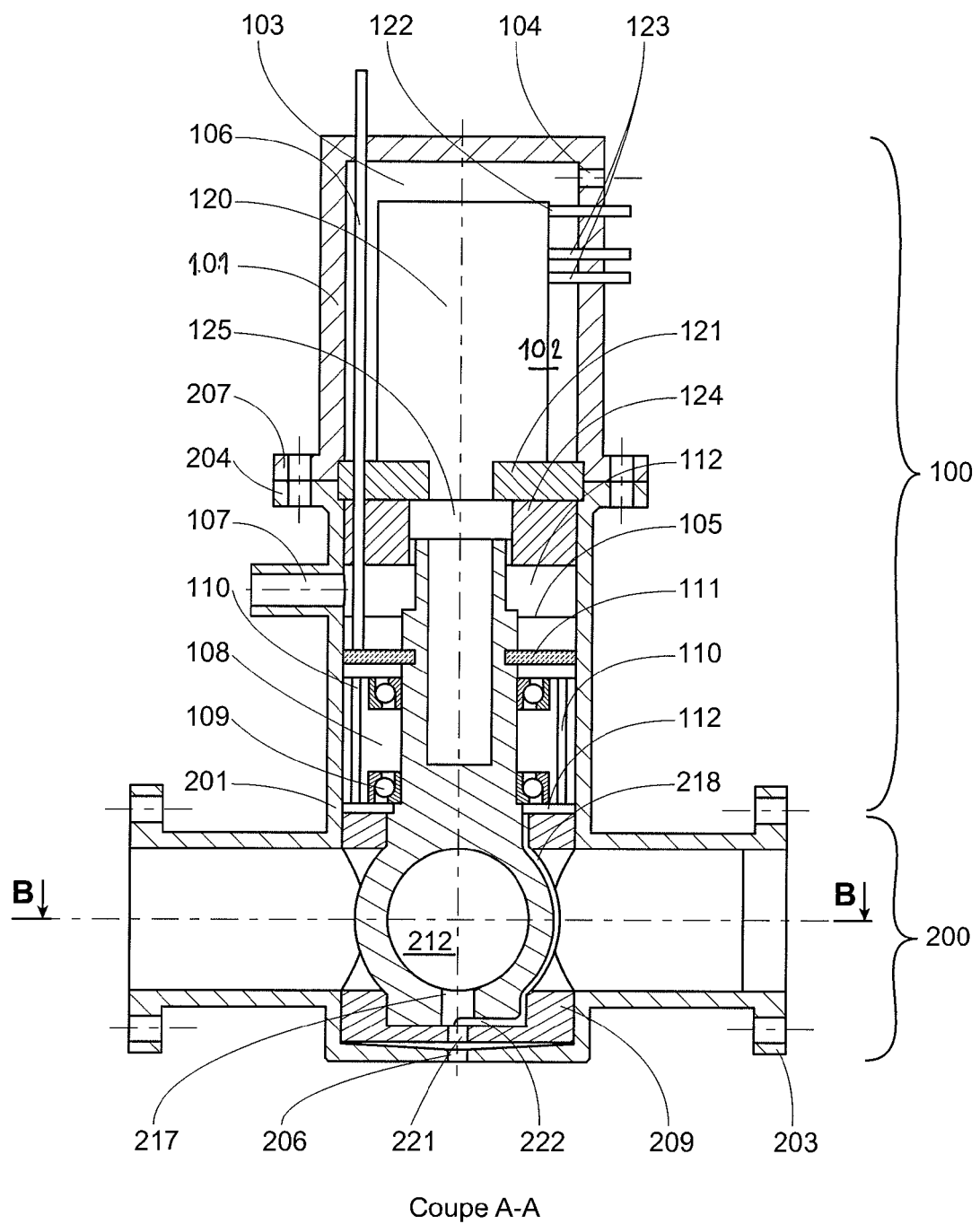
FIG. 10 is a simplified cross-section view of a system according to a first embodiment of the invention.
Figure 11:
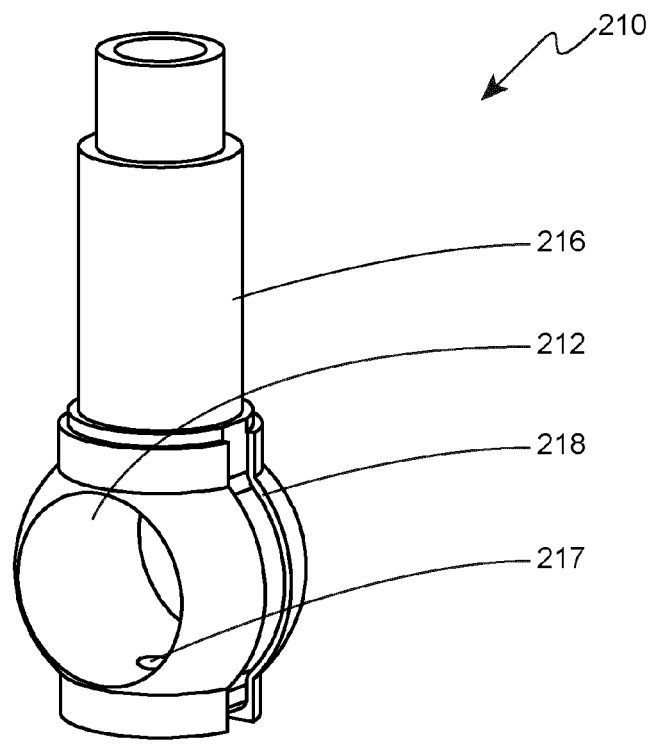
FIG. 11 is a perspective view of a cylindrical plug provided on the system according to an embodiment of the invention shown in FIG. 10.
Figure 12:
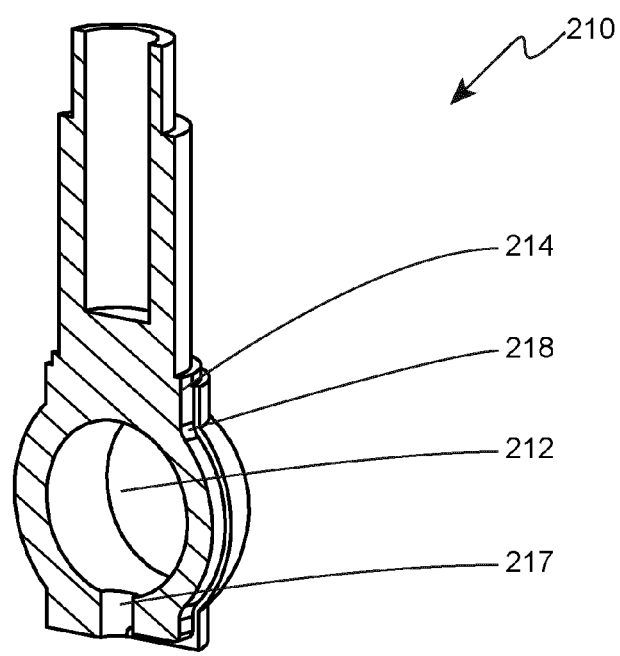
FIG. 12 is a cross-section view of the plug shown in FIG. 11.

As shown in FIGS. 10, 11 and 12, the plug 210 has a body 211 that comprises an internal passage 212 for the liquid. This internal passage 212 makes it possible to place the inlet and the outlet of the liquid into communication for certain angular positions at least of the plug 210 with respect to the body 201 of the valve. As with all plug valves, the shape and the size of the inside of the body 201 of the valve and of the body 211 of the plug are chosen in such a way that the liquid can flow from one flange to the other only through the internal passage 212 carried by the body 211 of the plug 210. Preferably, the valve body comprises a seat 209 conformed to receive the spherical plug. The seat 209 is integral with the body 201 of the valve 200.

The angular position of the plug with respect to the body 201 of the valve therefore with respect to the inlet 202 and outlet 203 flanges, is controlled by a control device which typically comprises an actuator, for example a reduction gear 120.

The body 201 of the valve and the cover 101 form an enclosure 102 inside of which the expansion reservoir 100 is housed. This enclosure 102 is sealed except for a channel 213 for communication between the expansion reservoir 100 and one of the flanges, such as shall be described hereinafter, and possibly except for an overflow 107, an orifice 104 for the management of the pressurisation gas which will also be described in more detail in what follows.

Particularly advantageously, the body 211 of the plug comprises at least partially a channel 213 that allows the liquid circulating inside the circuit and coming from one of the two flanges 202, 203, to penetrate inside the expansion reservoir 100 formed by the enclosure 102. It is as such qualified as an expansion channel 213.

The body 211 of the plug 210 comprises at least one lateral opening located on a lateral face 219 of the plug. Valve 200 is conformed to ensure permanent communication between said lateral opening and the expansion reservoir 100. In the example shown, the lateral opening forms a recess 218 which extends from the inside of the circuit to the expansion reservoir 100.

Preferably, the recess 218 extends from an upper face of the body 211 of the plug to the lower face 220 of the plug 210.

Advantageously, the recess 218 forms a groove. The valve is conformed in such a way that at least when the valve is closed the recess 218 is in direct communication with the liquid coming from the inlet or from the outlet of the valve 200. In FIG. 10, the recess 218 communicates with the liquid passing through the flange 203. As such, when the internal passage 212 no longer communicates directly with the inlet or the outlet of the valve, the liquid present in the inlet or the outlet of the valve can therefore communicate with the expansion reservoir 100 by entering into the expansion channel 213 via the recess 218.

Moreover, the valve is conformed in such a way that at least when the valve 200 is open at least partially, i.e. when the internal passage 212 communicates directly with the inlet and/or the outlet of the valve, the recess 218 cooperates with the inner wall 207 of the seat 209 in such a way as to form a conduit of which the section, taken perpendicularly to the flow of the liquid in the conduit forms a closed perimeter. This conduit is in communication on the one hand with the expansion reservoir 100 and on the other hand with the internal passage 212. Preferably, this conduit opens on the one hand into the expansion reservoir 100 and opens on the other hand into a space 221 formed by the lower face 220 of the plug 210 and the bottom 208 of the body 201. In the embodiment shown and wherein the body 201 comprises a seat 209, the bottom 208 delimiting with the lower face 220 of the spherical plug the space 221 is the bottom of the seat 209. This space 221 is in communication with the internal passage 212 via a channel 217, typically a hole, made in the plug 210. In the non-restricted example shown, this space 221 is formed by a groove 222 made on the lower face 220 of the body 211 of the plug 210 and which cooperates with the bottom 208 of the seat 209 in order to define a passage for the liquid.

An expansion channel forming a recess 218 or a groove on the lateral face of the body 211 of the plug 210 advantageously makes it possible to simplify the carrying out of the plug.

This example is not however restrictive. The invention extends to embodiments wherein the expansion channel forms a conduit that has a lateral opening that does not form a groove. Moreover, the invention extends to embodiments wherein the expansion channel forms a conduit, typically a hole, which communicates directly between the lateral opening and the internal passage 212.

As such, the valve 200 is conformed in such a way that, regardless of the position of the plug 210, the expansion channel 213 is always in communication with the inlet or the outlet of the valve 200. Either the lateral opening communicates directly with the inlet or the outlet of the valve, or it communicates with the internal passage 212, preferably via the space 211, when the internal passage 212 communicates with the inlet or the outlet of the valve. Liquid can therefore permanently reached the expansion reservoir 100 formed by the enclosure 102. This shall be described in more detail in reference to FIGS. 13 to 17.

The expansion volume is the volume of liquid 112 located between the upper face 214 of the plug 210 and the free surface 105 of the liquid.

Figure 1:
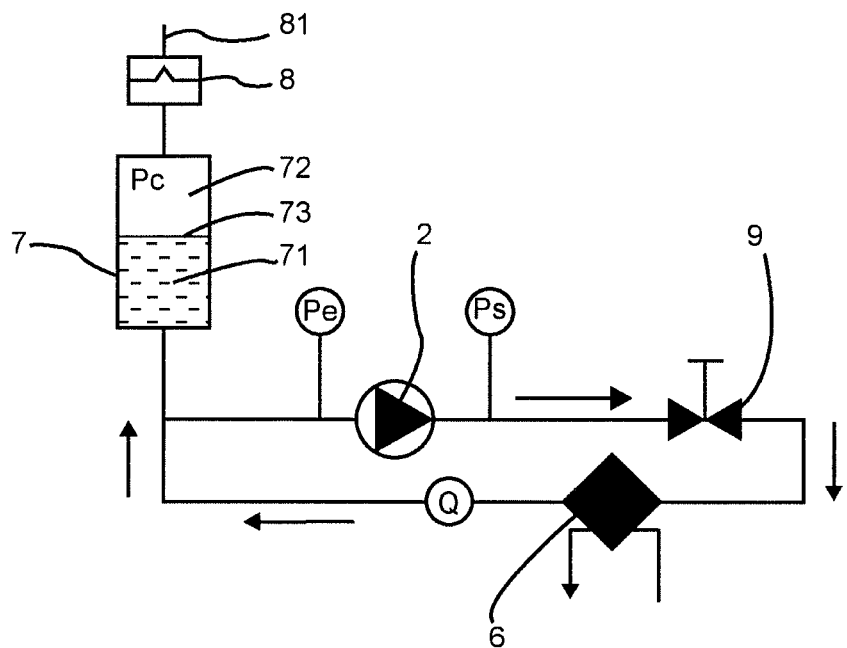
FIG. 1 is a diagram showing a first circuit according to prior art wherein the liquid circulates in a first direction.
Figure 2:
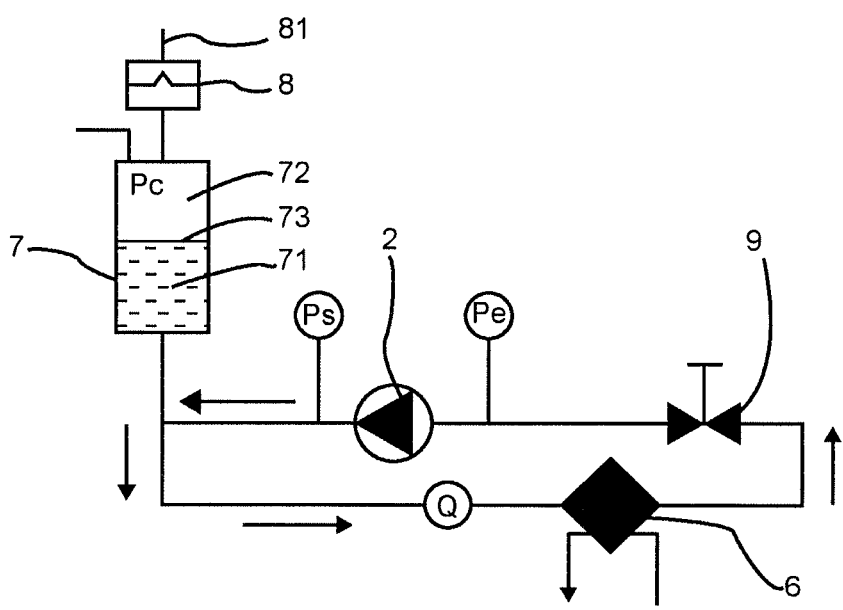
FIG. 2 is a diagram of the circuit shown in FIG. 1 and wherein the liquid circulates in a second direction opposite the first.

The plug 210 represents a variable load loss. The communication between the circuit and the expansion reservoir 100 is carried out via a path which is always outside of the pump-load loss section induced by the plug 210. As such, regardless of the expansion reservoir 100 in the circuit, the expansion reservoir 100 never sees the pressure delivered by the pump contrary to the expansion reservoir of the circuit shown in FIG. 2 which is in direct communication with the outlet of the pump. Moreover, in the circuit of FIG. 2 the expansion reservoir 100 imposes the pressure between the valve and a component such as the exchanger.

Preferably, and as shown in FIG. 10, a bearing 108 provided with rollers 109 is provided in order to ensure the guiding in rotation of the plug 210. Preferably, the bearing 108 guides the plug 210 on an axis 216 of the plug 210 integral with the body 211 of the plug and which extends according to the direction of rotation of the latter. Preferably, the bearing 108 is situated in the immediate vicinity of the upper face 214 of the plug 200 forming a cylinder in its upper portion. A passage 110 is provided in the bearing 108 for the liquid coming from the internal passage 212 carried by the body 211 of the plug. According to an alternative embodiment not shown, if the bearing 108 is housed in the body 201 of the valve, a passage can be made in the thickness of the wall of the body 201 of the valve in order to allow the liquid to pass from the upper face 214 of the body 211 of the plug to a space located above the bearing.

As such in operation, the bearing 108 is immersed in the liquid 112 present in the expansion reservoir 100.

Advantageously, an aerator device 111 is provided to prevent projections of liquid coming from the expansion channel 213 with a substantial speed. In this example, an aerator device 111 is placed above the bearing 108. In normal operation, the aerator device 111 is immersed and the free surface 105 of the liquid 112 is located above the aerator device 111.

An overflow 107 is also provided to evacuate any overflow of liquid. In normal operation, the free surface 105 of the liquid 112 is therefore located underneath the overflow 107.

In the enclosure 102 formed by the body 201 of the valve 200 and the cover 101, and above the free surface 105 of the liquid 112, is located the pressurisation gas 103 also designated as sky gas, of which the function is to offset the variations in volume of the liquid in the circuit and to ensure that the pressure of the circuit remains within an acceptable operating interval.

An orifice 104 is also provided for the management of the pressure of the pressurisation gas 103. This orifice 104 is preferably located in the upper portion of the cover 101.

Advantageously but optionally, the system also comprises a protective device 8, preferably connected to the orifice 104 for the management of gases, and configured to adjust and to limit the pressure of the gas in the expansion reservoir 100 and therefore the pressure of the liquid in the circuit when the latter exceeds a threshold value that could damage the circuit. When the protective device 8 is activated, the excess gas pressure is directed to an outlet 81 which prevents exceeding an admissible pressure limit for the expansion reservoir and the circuit.

As indicated hereinabove, a control device is provided in order to control the angular position of the plug 210 with respect to the body 201 of the valve. Note here that the angular position of the plug 210 is perfectly independent of the pressure inside the circuit and of the pressure inside the expansion reservoir 100.

According to a particular advantageous embodiment, it is placed that this control device be housed inside the enclosure 102 and that, also preferably, the coupling between the plug 210 and the control device also be housed inside the enclosure 102. As such, the invention makes it possible to substantially reduce the constraints for sealing, as such improving the reliability of the system 10.

More precisely, the control device comprises a motor, typically a reduction gear 120, preferably housed in the enclosure 102 above the overflow 107. It is therefore immersed in the pressurisation gas by being advantageously separated from the liquid 112. A coupling device 125 between the outlet of the reduction gear 120 and the plug 210 is also located above the overflow 107 and therefore immersed in the pressurisation gas 103 while still being separated from the liquid 112. The axis 216 of the plug 210 connects the coupling device 125 to the body 211 of the plug. Preferably, the reduction gear 120 is arranged in such a way that its output axis is coaxial with the axis 216 of rotation of the plug 210.

Advantageously, a thermal protection device 124 is arranged between the liquid 112 and the reduction gear 120 in such a way as to preserve the latter from the heat of the liquid 112. This is even more advantageous when the liquid is a liquid metal such as sodium. The thermal protection device 124 can be for example a stack of thin disks and spaced apart or any other volume or association of subsets having low thermal conductivity. Preferably, the thermal protection device 124 is arranged around the coupling device 125 as is shown in FIG. 10.

Preferably, the motor is fixed onto a support 121 conformed to be fixed into an upper portion of the body 201 of the valve, for example on the opening of the body 201 of the valve. Once the motor is fixed on the body 201 of the valve, the cover 101 can then be positioned on the body 201 of the valve in order to cover the motor and form the sealed enclosure 102. The mounting of the system 10 is therefore particularly simple. For example, the attaching between the body 201 of the valve and the cover 101 is carried out by bolting of two flanges 204, 207 carried respectively by the body 201 of the valve and the cover 101.

When the liquid is brought to a high temperature, typically between 300 and 500° C. as in the case with liquid sodium, the system 10 advantageously comprises a cooling system 123 of the motor. A heat carrying fluid then circulates in the pipes passing through the enclosure 102 and penetrates into the motor. Preferably, holes for the passage of these pipes are made in the cover 101.

The enclosure 102, preferably the wall of the cover, also comprises a hole for the passage of a power supply line or lines 122 of the motor.

The system 10 can also comprise one or more level sensors 106 to measure and control the level of liquid in the expansion reservoir 100. A hole can be made in the enclosure 102, typically in the wall of the cover 101, for the passage of the sensors 106.

Preferably, the body of the valve has an emptying hole 206 made in the bottom 209 of the body 201 and which makes it possible to facilitate the emptying of the system 10 incorporating the valve 200 and the expansion reservoir 100.

The invention as such proposes a system 10 integrating within the same component a valve 200, in particular an in-line valve, and an expansion reservoir 100 in permanent communication with the liquid of the circuit and for which the design offers improved operating reliability, a particularly simple and effective seal, as well as easy assembly.

The operation of the invention shall now be described in detail in reference to FIGS. 13 to 17.

Figure 13:
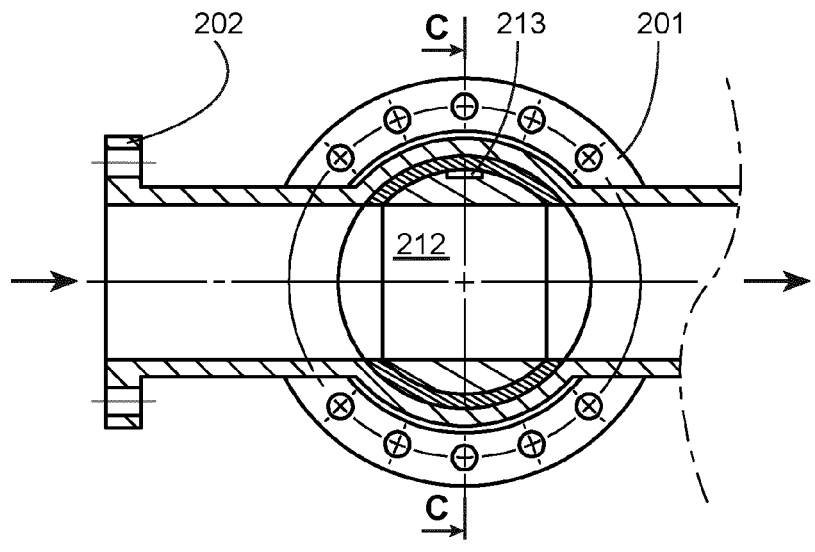
FIG. 13 is a view along cross-section BB of the system according to the embodiment of the invention shown in FIG. 10, wherein the valve is fully open.
Figure 14:
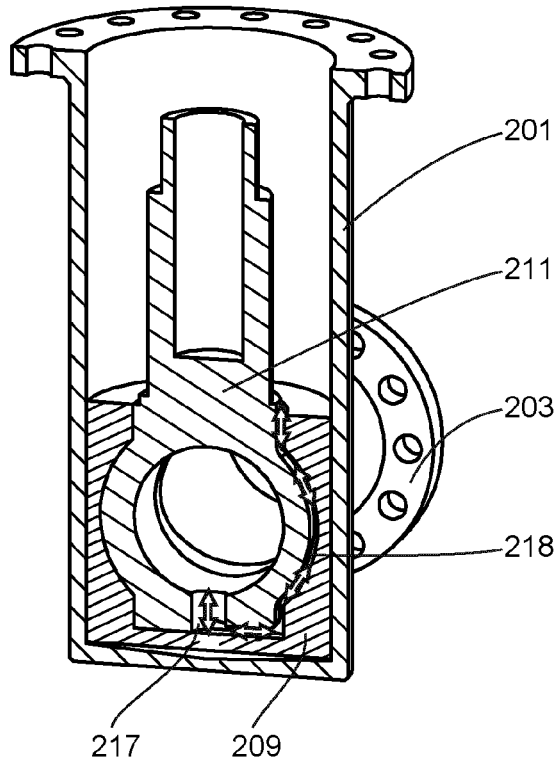
FIG. 14 is a view along cross-section CC of the system in the configuration shown in FIG. 13.
Figure 15:
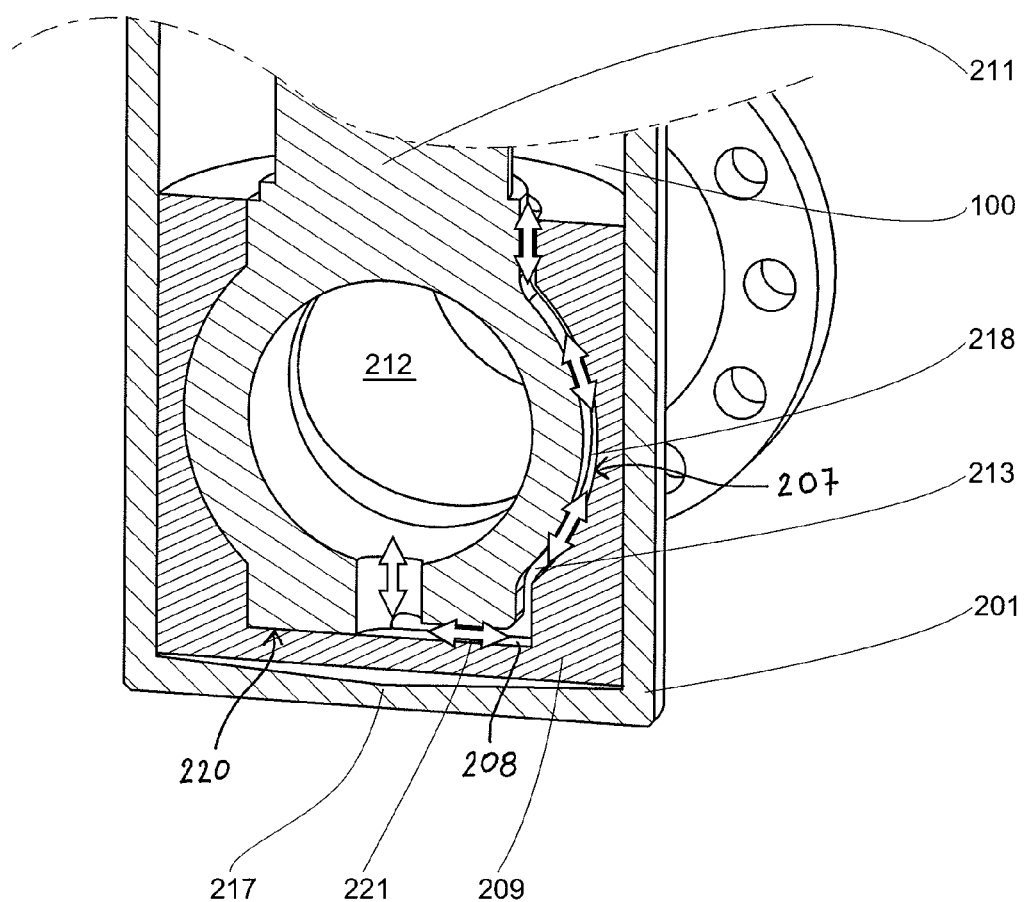
FIG. 15 is an enlarged view of FIG. 14, centred on the cooperation between the body of the valve and the plug.

FIGS. 13 to 15 show the valve 200 in fully open position. In this position, the plug 210 is equivalent to the pipe portion that the valve 200 replaces in circuit 1. The load loss in the valve 200 is very low and even zero, which is an advantage with respect to the other valves with a transfer obturator. In this position the circulation of the liquid is possible in both directions.

Moreover, as can be seen clearly in FIG. 15, the internal passage 212 is in communication with the liquid of the circuit. The liquid can therefore pass through the lower channel 217, reach the space 221 in order to reach the conduit formed by the recess 218 and the inner wall integral with the body. From this conduit, the liquid can reach the expansion reservoir 100.

As such, the expansion channel 213 then formed by the lower channel 217, the space 221 and the recess 218 allows for the communication of the liquid circulating in the circuit 1 with the liquid 112 contained in the expansion reservoir 100.

Figure 16:
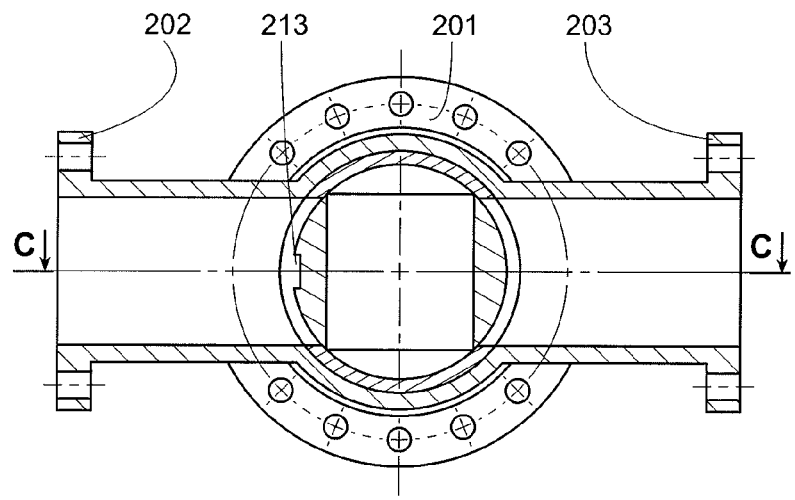
FIG. 16 is a view along cross-section BB of the system according to the embodiment of the invention shown in FIG. 10, wherein the valve is fully closed in a second direction.
Figure 17:
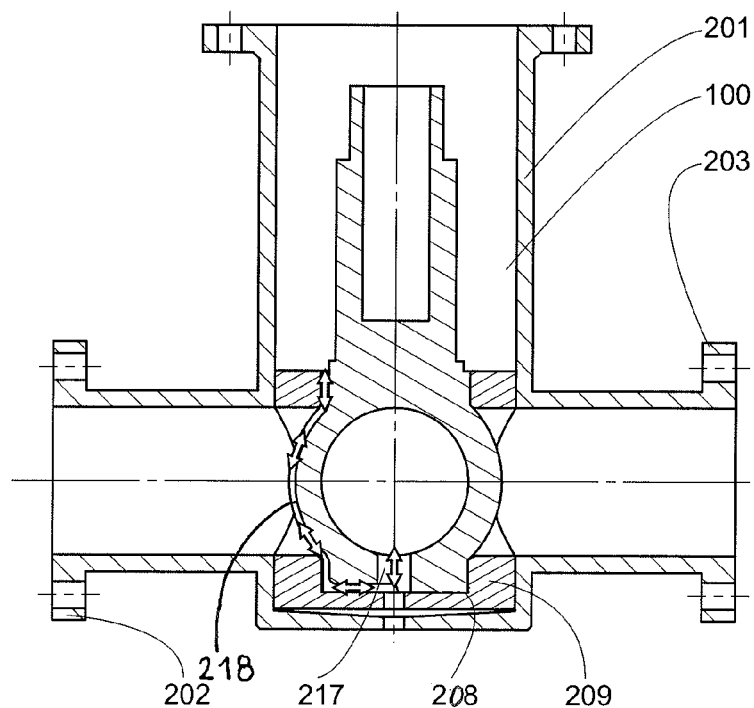
FIG. 17 is a view along cross-section DD of the system in the configuration shown in FIG. 16.
Figure 18:
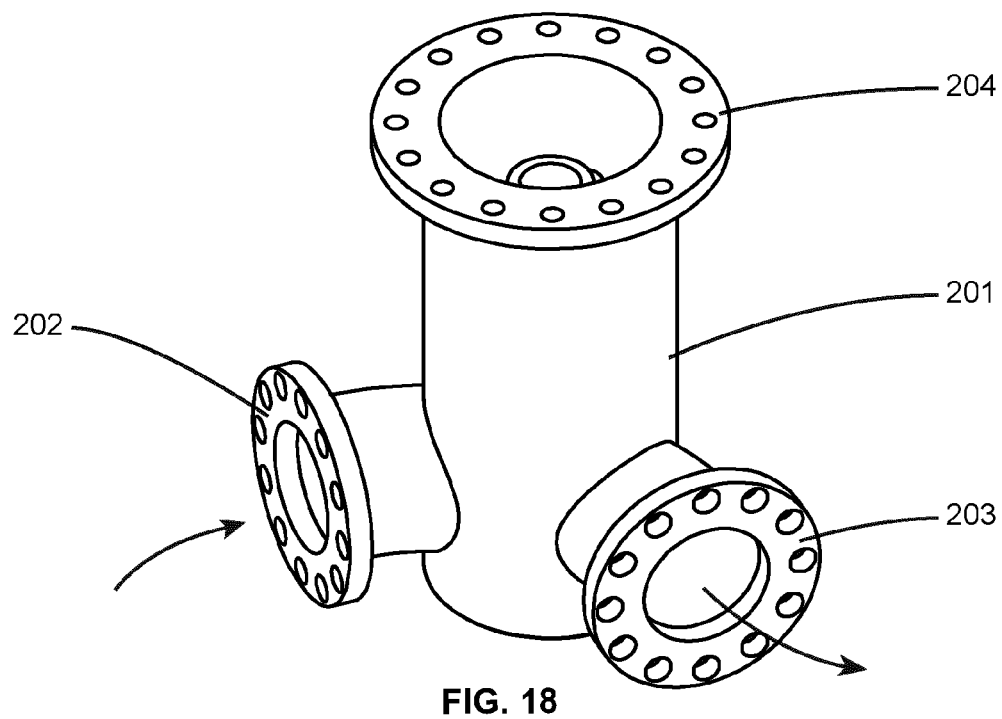
FIG. 18 is a perspective view of a valve body of a system according to a second embodiment of the invention.

When the valve 200 is closed, as shown in FIGS. 16 and 17, the circulation of the liquid in the circuit 1 is interrupted. The internal passage 212 is no longer in communication with the section of the circuit connected to the flange 202 or even with the circuit connected to the flange 203. The recess 218 forms an opening that opens into the circuit. The liquid can therefore directly reach the recess 218 from the inlet or the outlet of the valve. In the example shown, the recess 218 is arranged directly facing the flange 202. As the recess opens into the expansion reservoir 100, the latter is therefore in communication with the liquid. Such will be the case for all of the angular positions of the plug wherein the recess 218 is directly accessible by the liquid present in a section between the plug 210 and a flange 202, 203.

By the intermediary of the expansion channel 213, the expansion reservoir 100 therefore remains in communication with the liquid present in the section connected to this flange 202 as is shown in FIG. 15. This position if the valve 200 will be favoured when the flange 202 is connected to a section forming the inlet of the pump 2 or in the vicinity of the inlet of the pump 2. As such, in the event of a drop in pressure at the inlet of the pump 2, the expansion reservoir 100 allows for an offsetting of the volume and as such prevent a cavitation at the pump inlet.

As such, it is preferable to ensure to adapt the angular orientation of the plug 210 according to the direction of circulation of the liquid. Generally, the position of the plug 210 will be controlled in such a way as to place in communication the expansion reservoir 100 with a portion of the circuit 1 that separates the expansion reservoir 100 from the inlet of the pump 2.

In addition to allowing for permanent communication between the expansion reservoir 100 and the liquid of the circuit, the invention makes it possible to limit the speed of the liquid reaching the expansion reservoir 100, in particular when the valve is open and the liquid passes through with a high speed. However, due to the speed of displacement of the liquid in the circuit 1, liquid could arrive at a relatively high speed in the expansion reservoir 100 if the communication were direct. The invention as such makes it possible to limit and even prevent the appearance in the expansion reservoir 100 of jets of liquid coming from the liquid in movement in the circuit 1. However, these jets can be a source of mechanical fatigue and control difficulties. Indeed, these projections of liquid induce significant fluctuations at the level of the free surface 105 of the liquid 112 and in the expansion reservoir 100. These jets of liquid can also be the source of the generation of aerosols for which the formation is sought to be avoided as much as possible in order to reinforce the reliability of the mechanism. The limitation of aerosols is very advantageous. Without this, aerosols can be found in the pressurisation gas 103 (sky gas) and come from the reduction gear 120. This reduces the reliability of it. The limitation of the aerosols significantly improves the reliability of the mechanism. Moreover, aerosols can impregnate the thermal protection 124 and therefore significantly increase its thermal conductivity. This would have the consequence of increasing the temperature of all of the mechanical parts that are above the thermal protection 124, of which the reduction gear 120, and would therefore reduce the reliability of it.

A second example of the system 10 according to the invention shall now be described in detail in reference to FIGS. 18 to 27.

The system according to this second example differs from the system according to the first example described in reference to FIGS. 8 to 17 in that the plug is cylindrical and in that the valve is an elbow. The other characteristics described in terms of the first example all apply to the second example.

Figure 20:
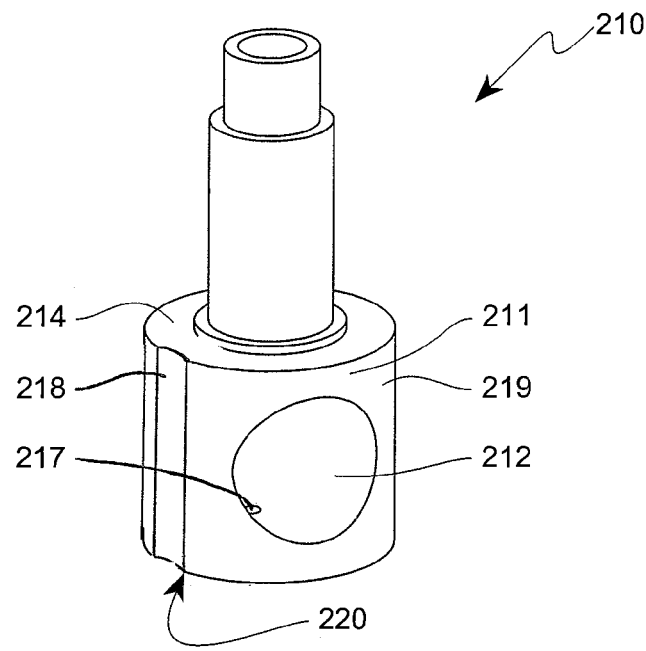
FIG. 20 is a perspective view of a cylindrical plug of a system according to a second embodiment of the invention.
Figure 21:
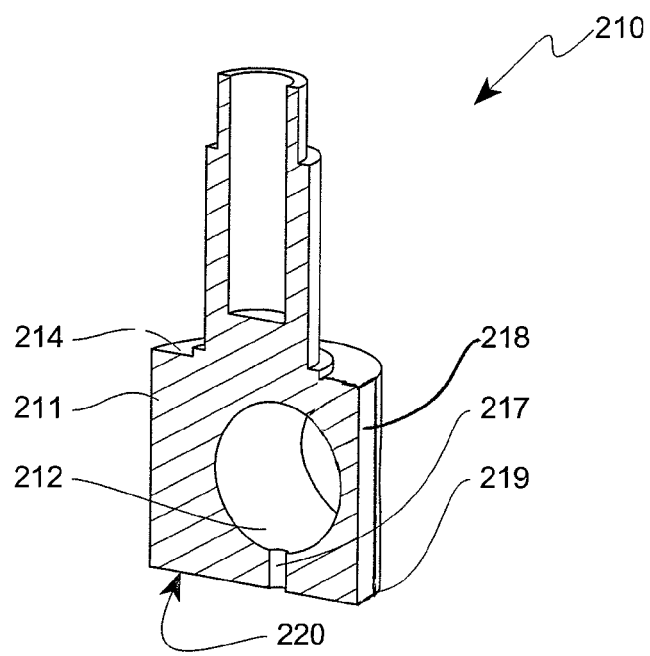
FIG. 21 is a cross-section view of the plug shown in FIG. 20.

In this second example, the expansion channel 213 is also configured to limit the appearance in the expansion reservoir 100 of jets of liquid coming from the liquid in movement in the circuit 1. Indeed, the expansion channel 213 of this second embodiment does not offer a straight path for the liquid, generates load losses and reduces the speed of the liquid when it enters the expansion reservoir 100. As in the preceding example, the expansion channel 213 comprises at least:

- a lower channel 217 opening on the one hand into the internal passage 212 and on the other hand under a lower face 220 of the body 211 of the plug. More precisely, the lower channel 217 opens into a space 221 defined by the lower face 220 of the body 211 of the plug and by the bottom 208 of the body 201 of the valve. As the valve is cylindrical, it is preferable to avoid a seat 209 to receive the plug 210;
- a recess 218 is made on a lateral face 219 of the body 211 of the plug, with this recess opening on the one hand under the lower face 220 and on the other hand in the expansion reservoir 100. This recess 218 preferably forms a groove. In the case where the plug 210 is cylindrical, and as shown in FIGS. 20 and 21, this groove is preferably linear and extends along a direction parallel to the axis of rotation of the plug 210.

The recess 218 made on the lateral face 219 of the body 211 of the plug as such forms an open channel. When this recess 218 is arranged facing the body 201 of the valve, more precisely facing its inner wall 207, it cooperates with the latter in such a way as to form a channel. Preferably, the section of this channel forms a perimeter. The section is taken according to a plane perpendicular to the direction of flow of the liquid in this channel. This channel then has two openings, one opening under the lower face 220 of the body 211 of the plug, the other opening into the expansion reservoir 100.

Figure 19:
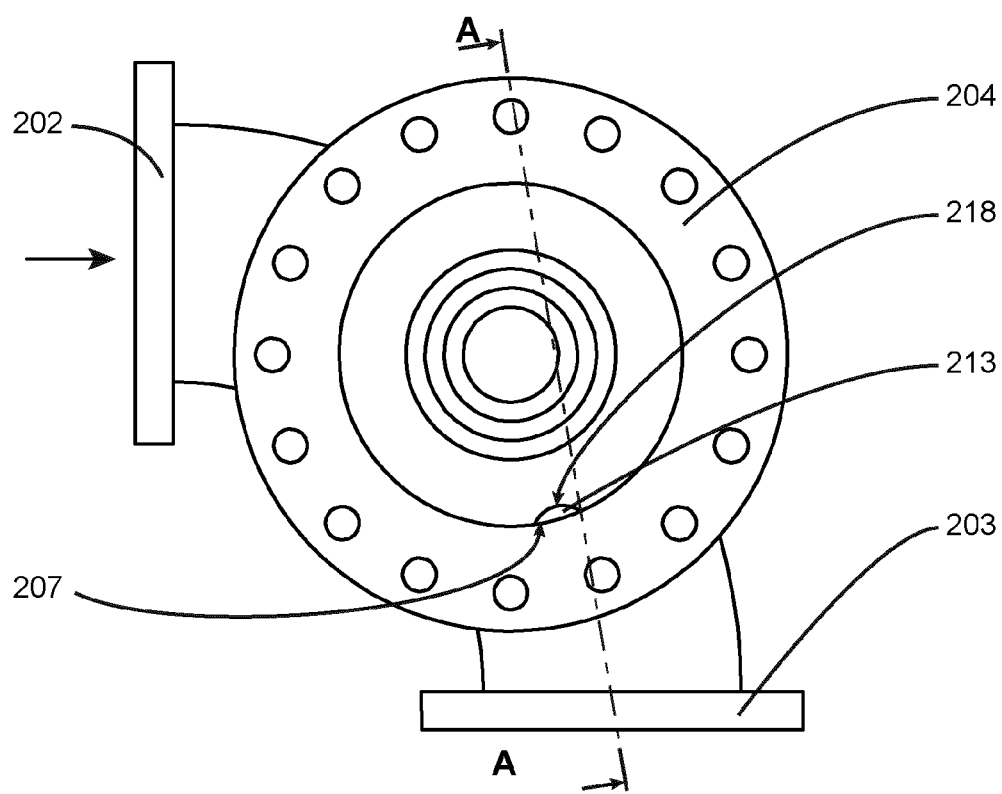
FIG. 19 is a top view of the valve body shown in FIG. 18.

FIG. 19 clearly shows the opening on the expansion reservoir 100 of this closed channel formed by the recess 218 and the inner wall 207 of the body 201 of the valve. The valve 200 is configured so that the liquid present in the internal passage 212 can pass into the lower passage 217 then into the recess 218 in order to reach the expansion reservoir 100. Between the lower channel 217 and the recess 218, the liquid transits by the space 221.

Figure 22:
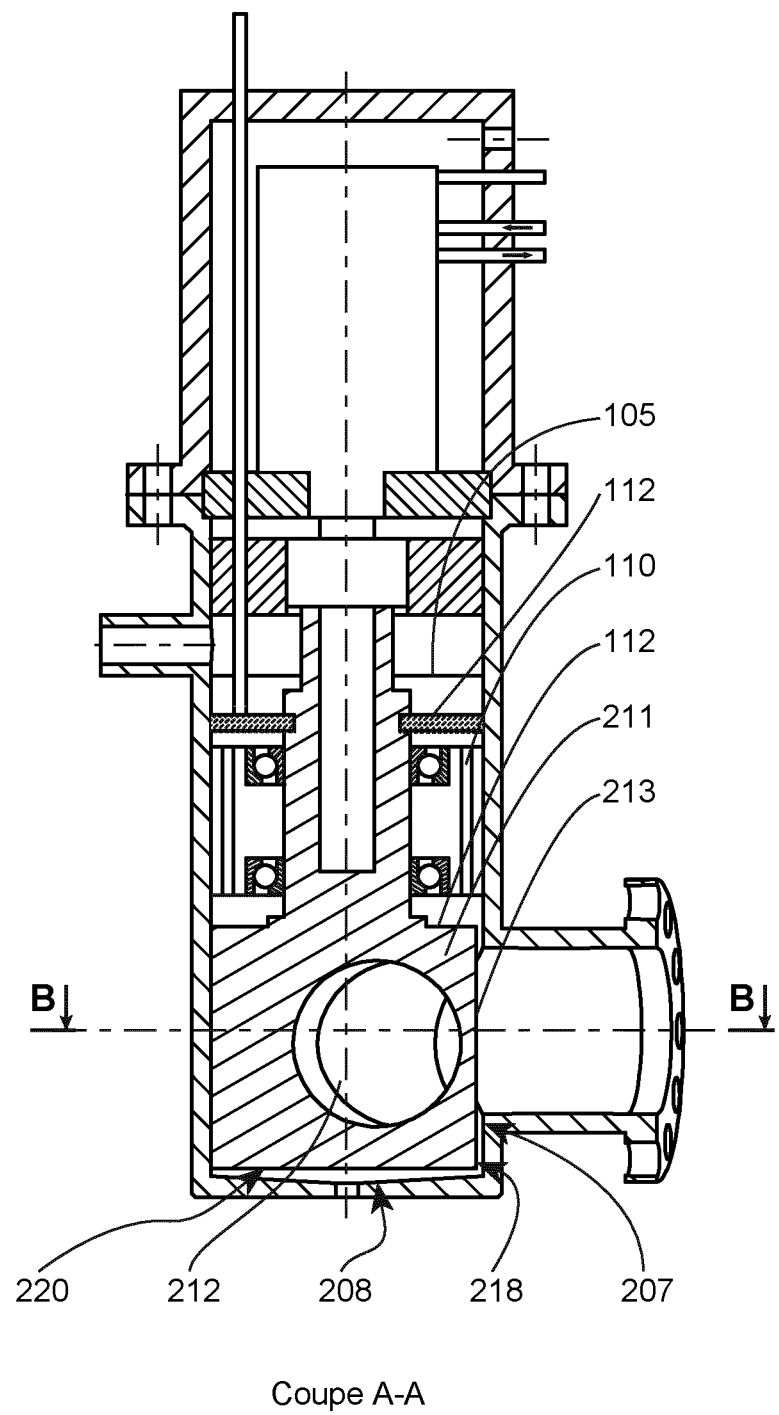
FIG. 22 is a simplified cross-section view of a system according to a second embodiment of the invention.

In FIG. 22, the expansion channel 213 appears between the bottom of the recess 218 and the inner wall of the body 201 of the valve. The other characteristics of the system are identical to those described in particular in reference to FIG. 10.

The operation of the system according to this embodiment shall now be described in detail in reference to FIGS. 23 to 27.

Figure 23:
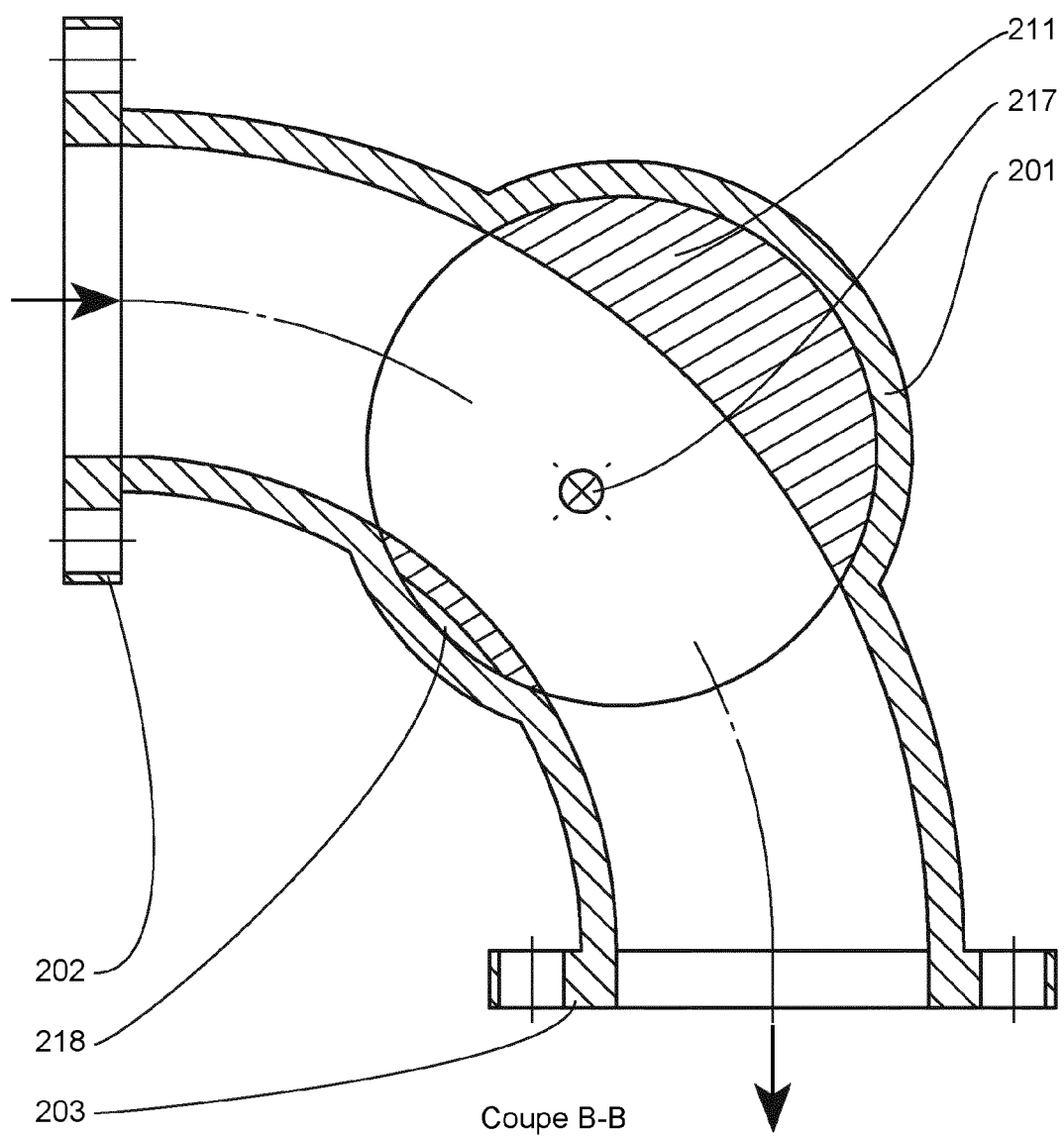
FIG. 23 is a view along cross-section BB of the system according to the embodiment of the invention shown in FIG. 22, wherein the valve is fully open.

FIG. 23 shows the valve 200 in fully open position. In this position, the plug 210 is equivalent to the elbow portion that the valve 200 replaces in circuit 1. The load loss in the valve 200 is very low and even zero. More generally, it is identical to the elbow that this valve replaces. In this position, the circulation of the liquid is possible in both directions. The liquid present in the internal passage 212 communicates with the lower channel 217 in order to reach the space formed between the lower face 208 of the body 211 of the plug and the bottom 220 of the body 201 of the valve. The liquid then reaches the closed channel defined by the cooperation between the recess 218 and the inner wall 207 of the body 201 of the valve. It can as such enter the expansion reservoir 100. The conveying of the liquid in the expansion channel 213, formed by the lower channel 217, the space 221 and the recess 218, makes it possible to limit the speed of the liquid at the inlet of the reservoir 100 and to limit the formation of jets of liquid in the latter. This is all the more so advantageous that in this angular position of the body 211 of the plug, the speed of the liquid passing through the valve 200 is normally substantial.

Figure 24:
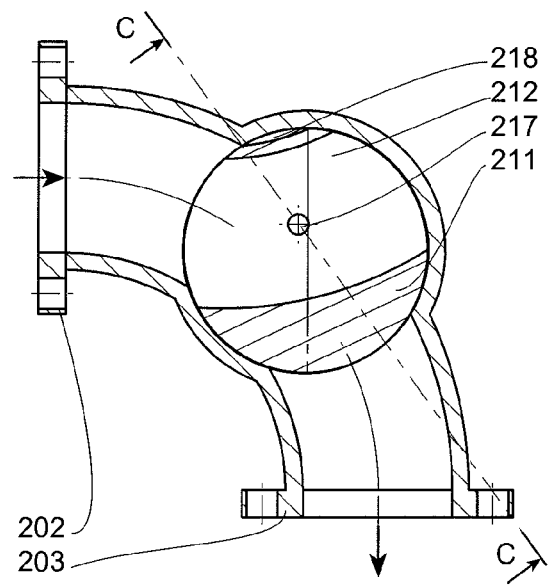
FIG. 24 is a view along cross-section BB of the system according to the embodiment of the invention shown in FIG. 22, wherein the valve is fully closed in a first direction.
Figure 25:
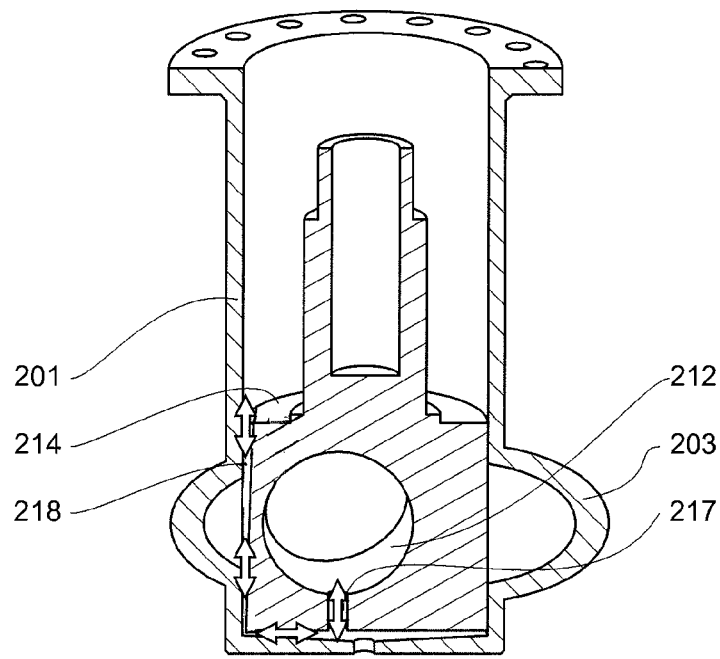
FIG. 25 is a view along cross-section CC of the system in the configuration shown in FIG. 24.

When the valve 200 is closed on the right, as shown in FIGS. 24 and 25, the circulation of the liquid in the circuit 1 is interrupted. On the other hand, the internal passage 212 remains in communication with the section of the circuit connected to the flange 202. By the intermediary of the expansion channel 213, the expansion reservoir 100 therefore remains in communication with the liquid present in the section connected to this flange 202 as is shown in FIG. 25.

In the case where the valve 200 is closed and where the recess 218 is not in direct communication with the inlet or the outlet of the valve 200 but cooperates with the inner wall 207 of the body 201 of the valve in order to form a closed channel, the liquid reaches the expansion reservoir 100 by passing through the internal passage 212, the lower channel 217, the space 221 then the recess 218, as is the case when the valve is open (as shown in FIG. 23).

In this position of the plug, the risks of jets of liquid appearing in the reservoir are limited and even suppressed.

Figure 26:
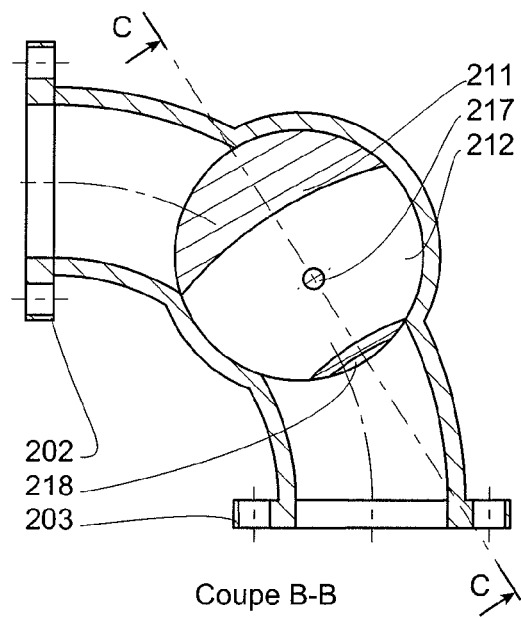
FIG. 26 is a view along cross-section BB of the system according to the embodiment of the invention shown in FIG. 22, wherein the valve is fully closed in a second direction.
Figure 27:
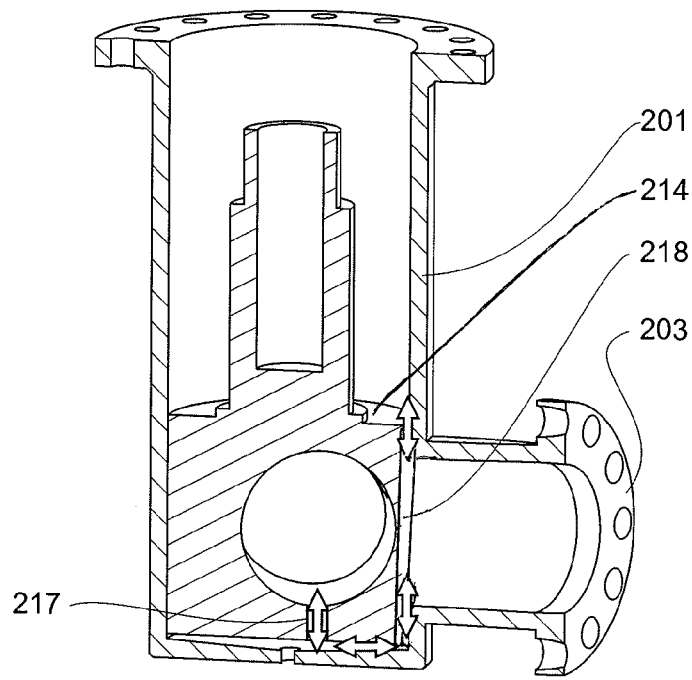
FIG. 27 is a view along cross-section DD of the system in the configuration shown in FIG. 26.

When the valve 200 is closed on the left, as shown in FIGS. 26 and 27, the circulation of the liquid in the circuit 1 is interrupted. On the other hand, the internal passage 212 remains in communication with the section of the circuit connected to the flange 203. By the intermediary of the expansion channel 213, the expansion reservoir 100 therefore remains in communication with the liquid present in the section connected to this flange 203 as is shown in FIG. 27.

In the case where the valve 200 is closed and where the recess 218 is in direct communication with the inlet or the outlet of the valve 200 (the outlet in the example of FIGS. 26 and 27) the liquid reaches the expansion reservoir 100 by penetrating from the inlet/the outlet of the valve directly into the recess 218. Of course liquid can penetrate into the internal passage 212 through the recess 218, the space 221 and the lower channel 217, but this liquid remains in the internal passage 212 without being able to pass through the valve 200.

This position if the valve 200 will be favoured when the flange 203 is connected to a section forming the inlet of the pump 2 or in the vicinity of the inlet of the pump 2. In this section, the speed of the liquid is generally low and the risks of jets in the expansion reservoir 100 are limited.

In each of the embodiments considered in the description hereinabove, the obturator is movable inside the body 201 of the valve 200 which is fixed with respect to the conduits connected to the inlet and to the outlet of the valve 200. The expansion reservoir 100 is fixed with respect to the body 201 of the valve 200. The movable obturator is movable with respect to the expansion reservoir 100.

Advantageously, the movable obturator is separated from at least a portion of the expansion reservoir 100. As such, in at least a portion of the expansion reservoir 100, the movable obturator is absent.

As such, the expansion reservoir 100 is separate from the movable obturator. This makes it possible in particular to not drive in displacement, typically in rotation, the expansion reservoir 100 during the displacement of the movable obturator, with the expansion reservoir 100 possibly comprising a significant volume of liquid and gas. The system is therefore made more robust, more reliable and less complex.

Moreover, the independence between the expansion reservoir 100 and the movable obturator makes it possible to independently size these two elements. In particular, the expansion reservoir 100 can be adapted, in particular in terms of volume, to the characteristics of the circuit (flow, pressure), while still retaining a movable obturator of small size. A movable obturator of small size makes it possible in particular to reduce the encumbrance of the system and to facilitate the carrying out of a movable obturator with dimensions and surface states that are perfectly controlled in such a way as to guarantee a good seal of the valve in closed position.

In light of the preceding description, it clearly results that the invention offers an effective system for improving the reliability and the simplicity of reversible circuits, particularly those in which circulate a liquid at high temperature and/or chemically reactive. The invention as such offers a particularly advantageous solution for test circuits for electromagnetic pumps for liquid metals such as those used in the sodium circuits of certain nuclear reactors. Moreover, the invention is advantageous, regardless of the liquid, in the circuits where it is necessary to proceed with an inversion in the direction of circulation, for example to clean in-line filters.

The invention is not limited to the embodiments described hereinabove and extends to all the embodiments covered by the claims.

In particular, the invention covers the systems wherein the motor is arranged outside of the enclosure formed by the valve body and by the cover. In this case, a coupling device passes through the enclosure.

REFERENCES

1. Circuit
2. Pump
3. Section
4. Section
5. Section
6. Exchanger
7. Expansion reservoir
71. Liquid
72. Pressurisation gas
73. Free level
74. Isolation valve
7'. Expansion reservoir
74'. Isolation valve
8. Protection device
81. Outlet
9. Throttle valve
91. Second throttle valve
10. System
100. Expansion reservoir
101. Valve cover
102. Sealed enclosure
103. Pressurisation gas
104. Orifice for pressurisation gas
105. Free surface of the liquid
106. Level sensor
107. Overflow
108. Bearing
109. Roller
110. Bearing passage
111. Aerator device
112. Liquid
120. Reduction gear
121. Motor support
122. Power supply/control lines
123. Cooling circuit
124. Thermal protection device
125. Coupling device
200. Valve
201. Valve body
202. Inlet flange
203. Outlet flange
204. Cover flange
205. Edge
206. Emptying hole
207. Inner wall
208. Bottom of the valve body
209. Seat
210. Plug
211. Plug body
212. Internal passage
213. Expansion channel
214. Upper face
215. Upper hole
216. Axis
217. Lower orifice
218. Recess
219. Lateral face
220. Lower face
221. Space

The invention claimed is:

1. A system for regulating a liquid in a circuit, with the system comprising:
    a plug valve comprising at least one inlet and one outlet, the plug comprising an internal passage through which is intended to pass the liquid flowing from the inlet to the outlet of the valve when the valve is open at least partially,
    an expansion reservoir in communication with the liquid flowing in the circuit and intended to contain liquid and a compensating gas,
wherein the plug comprises at least a part of an expansion channel which has at least one lateral opening located on a lateral face of the plug and which is conformed to provide in operation a communication between said lateral opening and the expansion reservoir, the valve being conformed in such a way that:
    at least when the valve is closed: the lateral opening is in direct communication with the liquid coming from the inlet or from the outlet of the valve;
    when the valve is partially open and when the valve is fully open, the lateral opening cooperates with an inner wall integral with a body of the valve in such a way as to form a conduit in communication on the one hand with the expansion reservoir and on the other hand with the internal passage.

2. The system according to claim 1, wherein the conduit opens on the one hand into the expansion reservoir and opens on the other hand into a space formed by a lower face of the plug and a bottom of the body of the valve, with this space being in communication with the internal passage by said part of the expansion channel, said part of the expansion channel being made in the plug.

3. The system according to claim 1, wherein the lateral opening is a recess, with the cooperation of the recess and the inner wall forming the conduit when the valve is open at least partially.

4. The system according to claim 2, wherein the lateral opening is a recess, with the cooperation of the recess and the inner wall forming the conduit when the valve is open at least partially and wherein the recess extends from the expansion reservoir to the lower face of the plug.

5. The system according to claim 1, wherein the plug is a spherical plug.

6. The system according to claim 1, wherein the plug is a cylindrical plug.

7. The system according to claim 6, wherein the conduit opens on the one hand into the expansion reservoir an opens on the other hand into a space formed by a lower face of the plug and a bottom of the body of the valve, with this space being in communication with the internal passage by a part of the expansion channel, said part of the expansion channel being made in the plug, the system being conformed in such a way that when the valve is open, the expansion reservoir communicates with the liquid passing through the valve solely through the recess, of said space and of the lower channel.

8. The system according to claim 1, wherein the inlet and the outlet of the valve form an angle between 130° and 180°.

9. The system according to claim 1, wherein the valve is a straight valve.

10. The system according to claim 1, wherein the inlet and the outlet of the valve forming an angle less than 130°.

11. The system according to claim 1, wherein the valve comprises a cover forming with the body an enclosure and wherein the expansion reservoir is housed in the enclosure.

12. The system according to claim 1, configured in such a way as to orient the direction of closing of the plug according to the direction of the circulation of the liquid in the circuit.

13. The system according to claim 1, wherein the plug is actuated by a control device comprising a reduction gear housed inside the expansion reservoir.

14. The system according to claim 13, wherein the reduction gear is immersed in the compensating gas.

15. The system according to claim 14, comprising an overflow in order to limit the level of liquid in the expansion reservoir and wherein the reduction gear is arranged above the overflow.

16. The system according to claim 15, comprising an aerator device arranged in the expansion reservoir, under the overflow and configured to break the jets of liquid coming from the expansion channel.

17. The system according to claim 13, comprising a thermal protection device housed inside the expansion reservoir and conformed to thermally insulate the reduction gear from the heat of the liquid.

18. The system according to claim 1, comprising a rotational guiding bearing of the plug and wherein the bearing is housed inside the expansion reservoir.

19. The system according to claim 18, configured in such a way that in operation the bearing is immersed in the liquid contained in the expansion reservoir.

20. The system according to claim 19, wherein the bearing comprises a passage allowing the free circulation of the liquid contained in the expansion reservoir through the bearing.

21. The system according to claim 1, wherein the valve is a throttle valve.

22. The system according to claim 1, wherein the plug is movable with respect to the expansion reservoir.

23. The system according to claim 1, wherein the expansion reservoir is vertically arranged higher than the plug.

24. The system according to claim 1, wherein the expansion reservoir surmounts the plug valve.

25. The system according to claim 1, wherein the expansion reservoir is fixed with respect to the body of the valve during the displacement of the plug valve.

26. The system according to claim 25, wherein the expansion reservoir is formed at least partially by the inner wall of the valve.

27. The system according to claim 26, wherein the expansion reservoir is connected to the valve by being arranged at a distance from the latter.

28. The system according to claim 1, wherein the valve comprises a cover, wherein the cover comprises an inner wall and wherein the expansion reservoir is formed by the inner walls of the body of the valve, by the inner wall of the cover and by an upper face of a body of the plug valve.

29. A circuit comprising the system according to claim 1 and a pump able to deliver in two opposite directions.

30. The circuit according to claim 29, wherein the plug comprises the expansion channel for the passing of the liquid opening into the inner passage of the plug in order to place in communication the expansion reservoir with the circuit, the circuit being configured in such a way as to orient the direction of closing of the plug according to the direction of the circulation of the liquid in the circuit.

31. The circuit according to claim 29, configured in such a way that, during the closing of the valve, the plug is turned in such a way that the expansion channel remains in communication with a portion of the circuit separating the valve from an inlet of the pump.

32. A method of using a system according to claim 1 comprising a step of providing the circuit with the liquid to be regulated, the liquid having a temperature greater than or equal to 350° C.

33. The method according to claim 32 wherein the liquid to be regulated is liquid sodium intended to provide for the heat transfer in a circuit of a sodium cooled nuclear reactor.

\* \* \* \* \*